US012634422B2

(12) United States Patent
Takahashi

(10) Patent No.: US 12,634,422 B2
(45) Date of Patent: May 19, 2026

(54) INFORMATION PROCESSING DEVICE, INFORMATION PROCESSING METHOD, AND PROGRAM FOR CALCULATING A CROSSTALK PARAMETER SET

(71) Applicant: Sony Group Corporation, Tokyo (JP)

(72) Inventor: Noriaki Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/728,894

(22) PCT Filed: Feb. 9, 2022

(86) PCT No.: PCT/JP2022/005095
§ 371 (c)(1),
(2) Date: Jul. 15, 2024

(87) PCT Pub. No.: WO2023/152822
PCT Pub. Date: Aug. 17, 2023

(65) Prior Publication Data
US 2025/0168310 A1 May 22, 2025

(51) Int. Cl.
*H04N 13/125* (2018.01)
*G06T 5/92* (2024.01)
*G06V 10/60* (2022.01)
*H04N 13/15* (2018.01)

(52) U.S. Cl.
CPC ............. *H04N 13/125* (2018.05); *G06T 5/92* (2024.01); *G06V 10/60* (2022.01); *H04N 13/15* (2018.05)

(58) Field of Classification Search
CPC ...... H04N 13/125; H04N 13/15; G06V 10/60; G06T 5/92; G09G 2320/0209
See application file for complete search history.

(56) References Cited

U.S. PATENT DOCUMENTS

2012/0262556 A1 10/2012 Kuwahara et al.
2014/0192170 A1* 7/2014 Samadani ............ H04N 13/111
                                                              348/51
2017/0034499 A1* 2/2017 Doron ..................... H04N 13/25

FOREIGN PATENT DOCUMENTS

CN       103051919 B   7/2015
EP        2521358 B1   9/2016
JP      2001-054143 A   2/2001
JP      2013-183426 A   9/2013
JP      2014-529954 A   11/2014

OTHER PUBLICATIONS

Janusz Konrad et al., Cancellation of Image Crosstalk in Time-Sequential Displays of Stereoscopic Video, IEEE Transactions on Image Processing, May 2000, pp. 897-908, vol. 9, No. 5.

* cited by examiner

*Primary Examiner* — Stephen G Sherman
(74) *Attorney, Agent, or Firm* — Paratus Law Group, PLLC

(57) ABSTRACT
An information processing device (1) has a measurement pattern generation unit (11) and a crosstalk parameter calculation unit (15). The measurement pattern generation unit (11) generates a crosstalk measurement pattern. The crosstalk parameter calculation unit (15) applies a measurement result of the crosstalk measurement pattern to a crosstalk model (21) including a plurality of deterioration characteristics to calculate a crosstalk parameter (23) set for each deterioration characteristic.

13 Claims, 17 Drawing Sheets

FIG.2

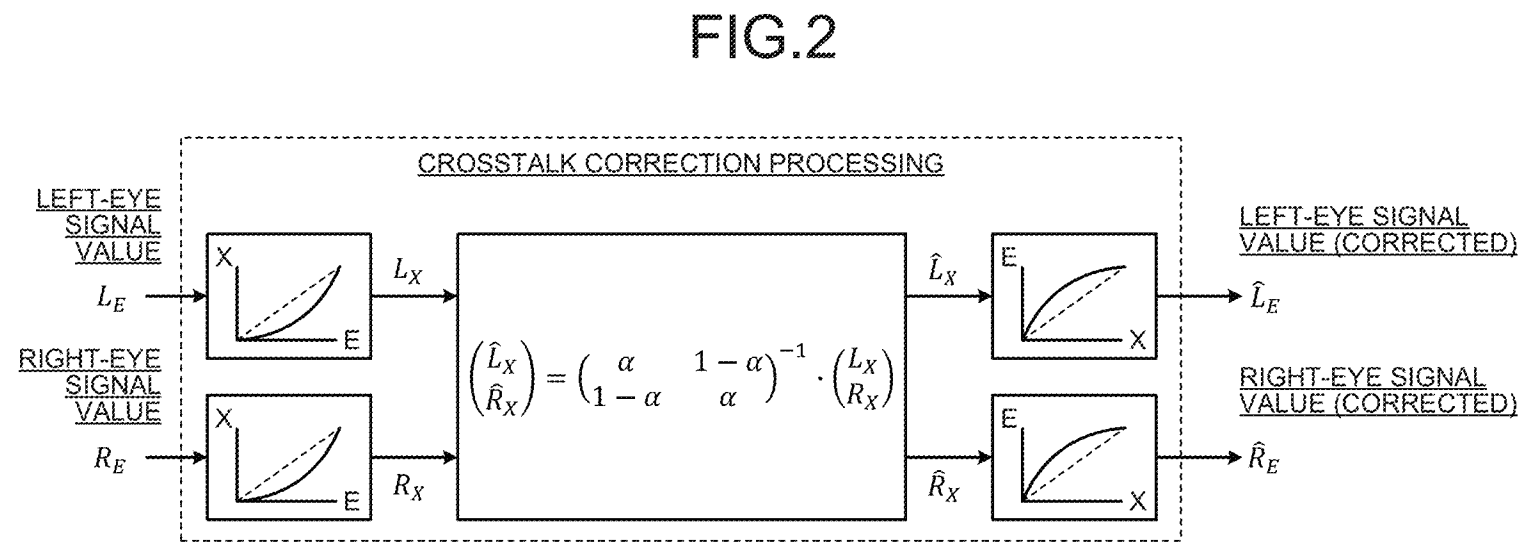

CROSSTALK CORRECTION PROCESSING

LEFT-EYE SIGNAL VALUE
$L_E$

RIGHT-EYE SIGNAL VALUE
$R_E$ $L_X$ $R_X$ $$\begin{pmatrix} \hat{L}_X \\ \hat{R}_X \end{pmatrix} = \begin{pmatrix} \alpha & 1-\alpha \\ 1-\alpha & \alpha \end{pmatrix}^{-1} \cdot \begin{pmatrix} L_X \\ R_X \end{pmatrix}$$

$\hat{L}_X$ $\hat{R}_X$

LEFT-EYE SIGNAL VALUE (CORRECTED)
$\hat{L}_E$

RIGHT-EYE SIGNAL VALUE (CORRECTED)
$\hat{R}_E$

FIG.6
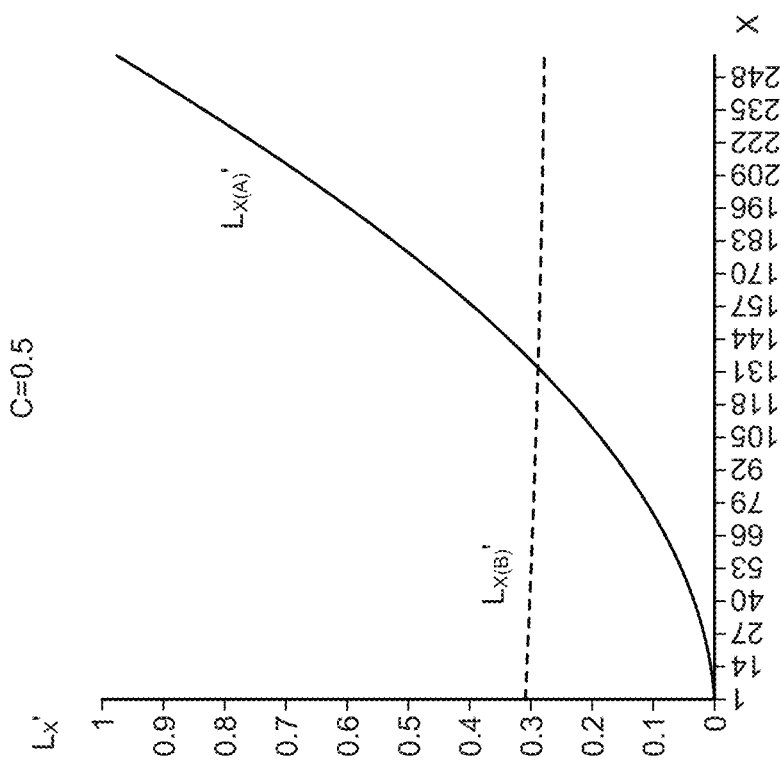
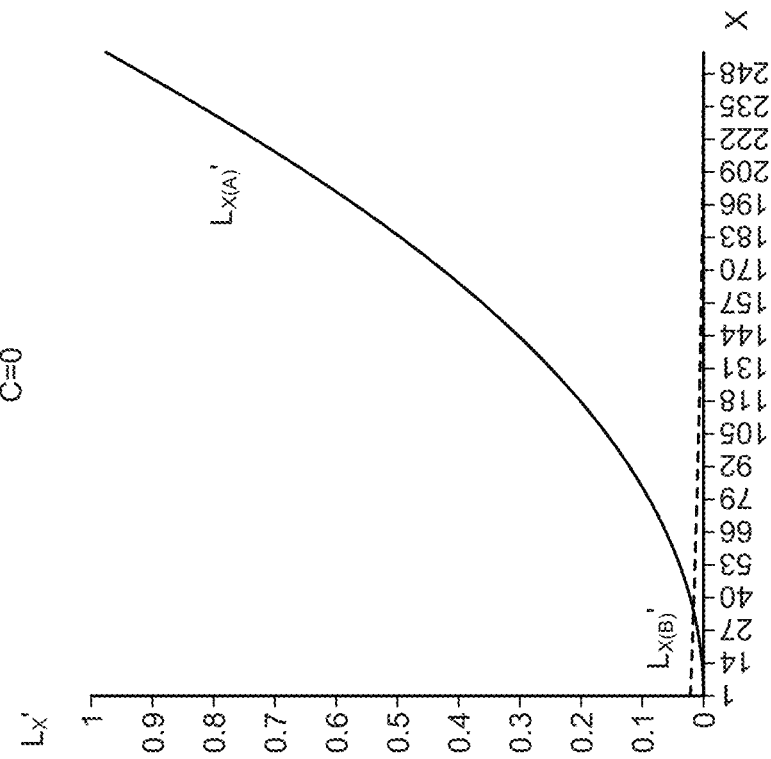

RPV(CMP)

FIG.17
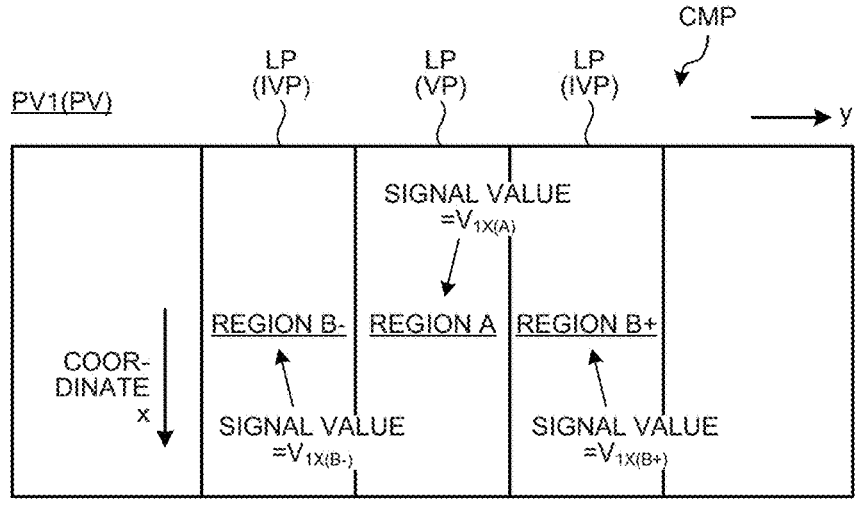
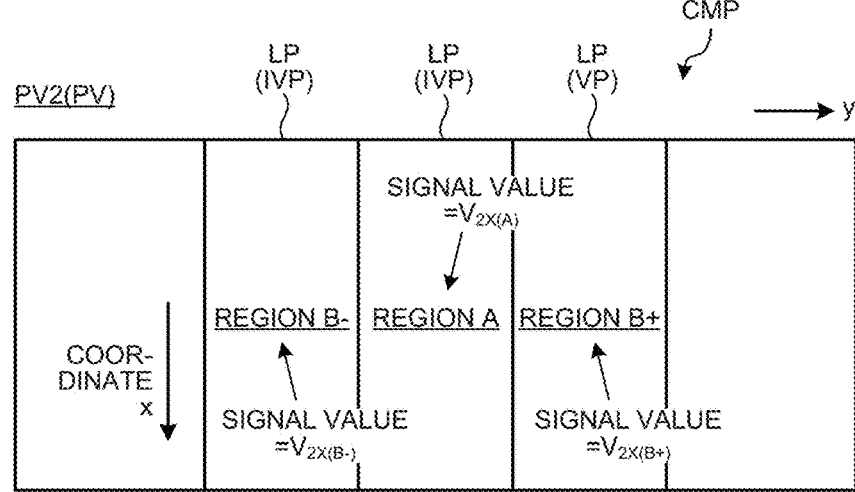
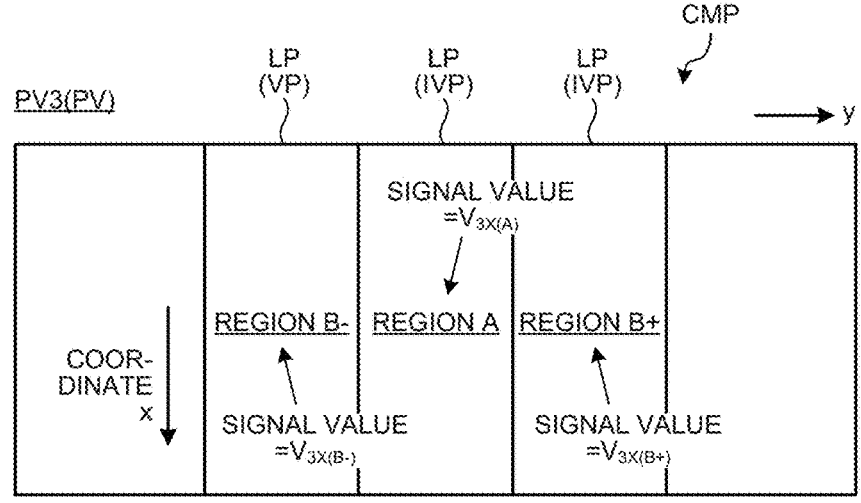

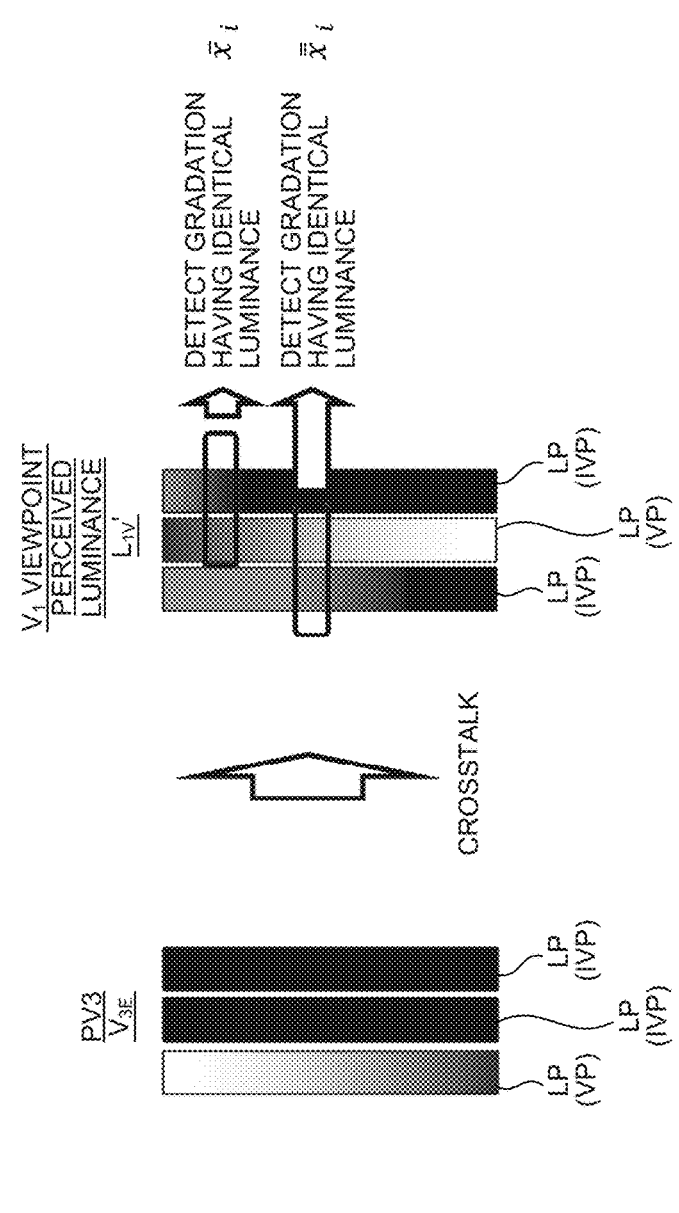
FIG.18
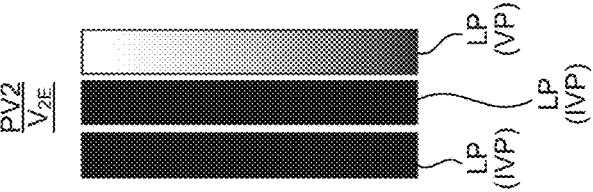
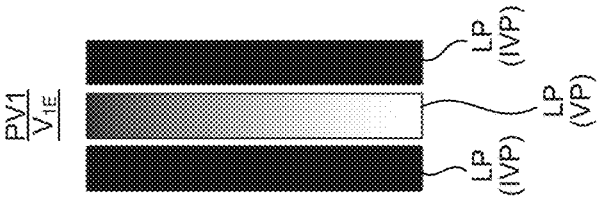

INFORMATION PROCESSING DEVICE, INFORMATION PROCESSING METHOD, AND PROGRAM FOR CALCULATING A CROSSTALK PARAMETER SET

CROSS REFERENCE TO PRIOR APPLICATION

This application is a National Stage Patent Application of PCT International Patent Application No. PCT/JP2022/005095 (filed on Feb. 9, 2022) under 35 U.S.C. § 371, which is hereby incorporated by reference in its entirety.

FIELD

The present disclosure relates to an information processing device, an information processing method, and a program therefor.

BACKGROUND

In a display device that displays a stereoscopic image or a multi-viewpoint image, image deterioration due to crosstalk is a problem. Therefore, there has been proposed a technique for suppressing crosstalk by reverse correction processing of performing conversion reverse to conversion caused by crosstalk.

CITATION LIST

Patent Literature

Patent Literature 1: JP 2013-183426 A

SUMMARY

Technical Problem

In the above conventional technique, crosstalk is modeled as a simple linear mixture model. However, it is known that crosstalk occurs due to various factors, and it is difficult to satisfactorily suppress crosstalk with a simple linear mixture model.

Therefore, the present disclosure proposes an information processing device, an information processing method, and a program therefor which enable crosstalk to be satisfactorily suppressed.

Solution to Problem

According to the present disclosure, an information processing device is provided that comprises: a measurement pattern generation unit that generates a crosstalk measurement pattern; and a crosstalk parameter calculation unit that applies a measurement result of the crosstalk measurement pattern to a crosstalk model including a plurality of deterioration characteristics to calculate a crosstalk parameter set for each deterioration characteristic. According to the present disclosure, an information processing method in which an information process of the information processing device is executed by a computer, and a program for causing the computer to execute the information process of the information processing device, are provided.

BRIEF DESCRIPTION OF DRAWINGS

FIG. 2 is a diagram illustrating an example of crosstalk correction processing.

FIG. 6 is a graph showing coordinate dependency of a left-eye level after crosstalk.

FIG. 10 is a schematic diagram of an information processing device according to a first embodiment.

FIG. 15 is a schematic diagram of an information processing device according to a second embodiment.

FIG. 17 is a diagram illustrating an example of a method of calculating a crosstalk parameter.

FIG. 18 is a diagram illustrating an example of a method of measuring crosstalk.

DESCRIPTION OF EMBODIMENTS

Figure 1:
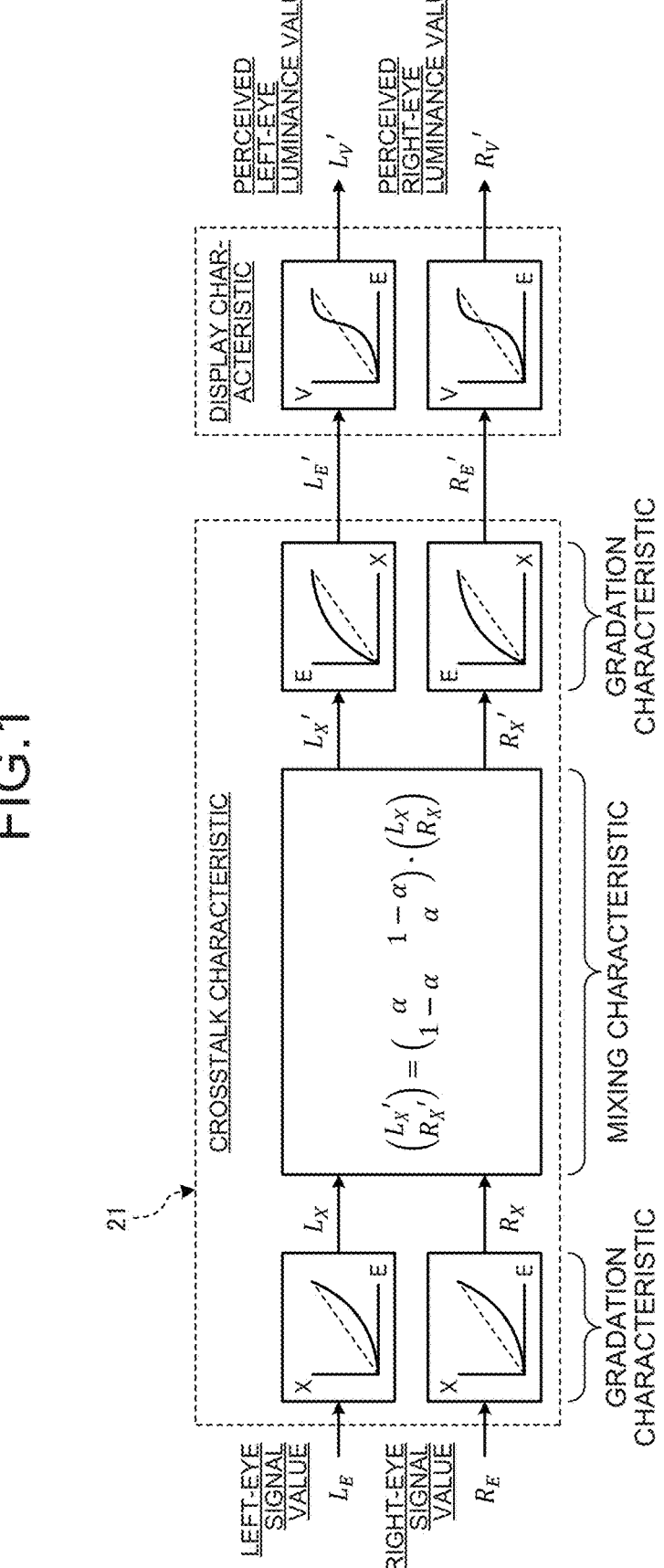
FIG. 1 is an explanatory diagram of a crosstalk model.

In the following, embodiments of the present disclosure will be described in detail with reference to the drawings. In each of the following embodiments, the same parts are denoted by the same reference numerals to omit overlapping description.

Note that the description will be given in the following order.

[1. Outline of Crosstalk Correction Processing]
[1-1. Crosstalk Model]
[1-2. Crosstalk Correction Processing]
[1-3. Crosstalk Parameter Calculation Method]
[2. First Embodiment]
[2-1. Configuration of Information Processing Device]
[2-2. Information Processing Method]
[2-3. Effects]
[2-4. Modification 1]
[2-5. Modification 2]
[2-6. Modification 3]
[2-7. Modification 4]
[2-8. Modification 5]
[3. Second Embodiment]
[3-1. Configuration of Information Processing Device]
[3-2. Information Processing Method]
[3-3. Effects]
[4. Third Embodiment]
[4-1. Crosstalk Parameter Calculation Method]
[4-2. Crosstalk Correction Processing]
[4-3. Crosstalk Parameter Calculation Method]
[4-4. Effects]

1. Outline of Crosstalk Correction Processing

The present disclosure proposes a method of setting a plurality of deterioration characteristics for crosstalk and accurately calculating a crosstalk parameter 23 (see FIG. 10) included in each deterioration characteristic. By setting a plurality of deterioration factors for crosstalk, it is possible to perform more accurate crosstalk correction processing than in a case of using a simple mixture model. The crosstalk correction processing of the present disclosure is performed using an information processing device 1 (see FIG. 10) to be described later.

Details of the present disclosure will be described below.

[1-1. Crosstalk Model]

FIG. 1 is an explanatory diagram of a crosstalk model 21.

In the present disclosure, for example, a gradation characteristic and a mixing characteristic are set as crosstalk characteristics. The gradation characteristic indicates gradation dependency of crosstalk. The mixing characteristic indicates a degree of interference between viewpoint images of a plurality of viewpoints.

Conventionally, a simple mixture model between viewpoint images has been used. However, actual crosstalk has luminance dependency and the like. It is difficult to obtain a mixing ratio having luminance dependency only by a mixture model. In a case where a crosstalk characteristic dynamically changes depending on a location of a screen, or on a temperature characteristic, a viewing position of a user, or the like, measurement becomes more complicated. Therefore, in the present disclosure, crosstalk correction is separately performed in gradation conversion processing and mixing processing. Parameters for use in the gradation conversion processing and the mixing processing are determined on the basis of a measurement result of crosstalk. This enables crosstalk correction processing in consideration of gradation dependency.

The crosstalk correction processing of the present disclosure can be applied to crosstalk between two viewpoints and to crosstalk between multi-viewpoints of three or more. As a display for two viewpoints, a three-dimensional (3D) display is known. In the following, an example in which the crosstalk correction processing of the present disclosure is applied to a 3D display will be described.

An xy coordinate system is set on a screen on which a plurality of viewpoint images are displayed. A y direction is a parallax direction, and an x direction is a direction orthogonal to the parallax direction. The parallax direction is a direction in which a parallax occurs. For example, an extending direction of a line obtained by projecting a line connecting a right eye and a left eye of a viewer on a screen is a parallax direction.

In the following, a signal value (pixel value) at the (x, y) coordinate in a video signal is described as $L_E(x, y)$ for a left-eye image, and is described as $R_E(x, y)$ for a right-eye image. In a case where coordinates are not concerned, (x, y) is omitted from the indication and $L_E$ and $R_E$ are respectively described. Luminance values perceived by a person through a display are similarly described as $L_V$ and $R_V$.

In a 3D display without crosstalk, a signal value of a left-eye image (left-eye signal value $L_E$) is converted with some display characteristics into a luminance value perceived by a left eye (left-eye luminance value $L_V$). The same applies to a right-eye image. A signal value of a right-eye image (right-eye signal value $R_E$) is converted with some display characteristics into a luminance value perceived by a right eye (right-eye luminance value $R_V$).

In 3D displays, there are mixture models of various characteristics, such as mixing in a ray of light, mixing in a device, and electrical mixing at transmission of a signal. Therefore, crosstalk has complicated gradation characteristics. In the present disclosure, a left-eye level and a right-eye level at a stage where a linear mixture model is established are described as $L_X$ and $R_X$. The crosstalk characteristic is formulated in three stages of (A) a gradation conversion characteristic of E→X, (B) a mixing characteristic between $L_X$ and $R_X$, and (C) a gradation conversion characteristic of X→E.

The gradation conversion characteristic of the above (A) is expressed by, for example, a conversion function of the following Formula (1) using a gradation conversion coefficient γ.

$$L_X = L_E^{\gamma} \tag{1}$$

Although in Formula (1), an exponential function is used as a conversion function, the conversion function may not be an exponential function. The conversion function may be any function that has monotonicity and that can define an inverse function. For example, a polynomial or a trigonometric function may be used as the conversion function. While Formula (1) indicates a conversion function of the left-eye signal value $L_E$, a conversion function of the right-eye signal value $R_E$ can also be expressed by the same function as the conversion function of the left-eye signal value $L_E$.

The mixing characteristic of the above (B) is expressed by the following Formula (2) using a mixing ratio α, for example.

$$\begin{pmatrix} L_X' \\ R_X' \end{pmatrix} = \begin{pmatrix} \alpha & 1-\alpha \\ 1-\alpha & \alpha \end{pmatrix} \cdot \begin{pmatrix} L_X \\ R_X \end{pmatrix} \tag{2}$$

$L_x'$ is a left-eye level after the left-eye level $L_X$ and the right-eye level $R_X$ have been mixed on the basis of the mixing ratio α. $R_X'$ is a right-eye level after the left-eye level $L_X$ and the right-eye level $R_X$ have been mixed on the basis of the mixing ratio α. In Formula (2), for the sake of simplicity, a proportion of the left-eye level $L_X$ leaking into the right-eye side and a proportion of the right-eye level $R_X$ leaking into the left-eye side are described as the same value. These proportions are, however, not necessarily the same. The four matrix elements shown in Formula (2) may be values independent from each other.

The gradation conversion characteristic of the above (C) is defined by an inverse function uniquely corresponding to Formula (1), as in the following Formula (3). While Formula (3) indicates a conversion function of the left-eye level $L_X'$, a conversion function of the right-eye level $R_X'$ can also be expressed by the same function as the conversion function of the left-eye level $L_X'$.

$$L_E' = L_X'^{1/\gamma} \tag{3}$$

$L_E'$ and $R_E'$ are a left-eye signal value and a right-eye signal value after the left-eye signal value $L_E$ and the right-eye signal value $R_E$ are mixed by crosstalk having luminance dependency. The left-eye signal value $L_E'$ and the right-eye signal value $R_E'$ are converted into a left-eye luminance value $L_V'$ and a right-eye luminance value $R_V'$ by the display characteristic other than the crosstalk characteristic. The left-eye luminance value $L_V'$ and the right-eye luminance value $R_V'$ are luminance values of an image in which the left-eye image and the right-eye image are mixed, unlike the left-eye luminance value $L_V$ and the right-eye luminance value Ry described above.

[1-2. Crosstalk Correction Processing]

FIG. 2 is a diagram illustrating an example of the crosstalk correction processing.

The crosstalk correction processing is formulated in three stages of (D) the gradation conversion characteristic of E→X, (E) matrix operation processing between $L_X$ and $R_X$, and (F) the gradation conversion characteristic of X→E. The gradation conversion characteristic of the above (D) is the same as the gradation conversion characteristic of the above (A), and is expressed by the above Formula (1). The gradation conversion characteristic of the above (F) is the same as the gradation conversion characteristic of the above (C), and is expressed by the above Formula (3). The matrix operation processing of the above (E) is expressed as the following Formula (4) using an inverse matrix of the above Formula (2).

$$\begin{pmatrix} \hat{L}_X \\ \hat{R}_X \end{pmatrix} = \begin{pmatrix} \alpha & 1-\alpha \\ 1-\alpha & \alpha \end{pmatrix}^{-1} \cdot \begin{pmatrix} L_X \\ R_X \end{pmatrix} \quad (4)$$

In Formula (4), hats above $L_X$ and $R_X$ indicate the left-eye level and the right-eye level after the matrix operation processing of the above (E). Similarly, in FIG. 2, hats above $L_E$ and $R_E$ indicate the left-eye signal value and the right-eye signal value after the crosstalk correction processing obtained by performing the gradation conversion processing of the above (F) on the left-eye level and the right-eye level after the matrix operation processing of the above (E).

Figure 3:
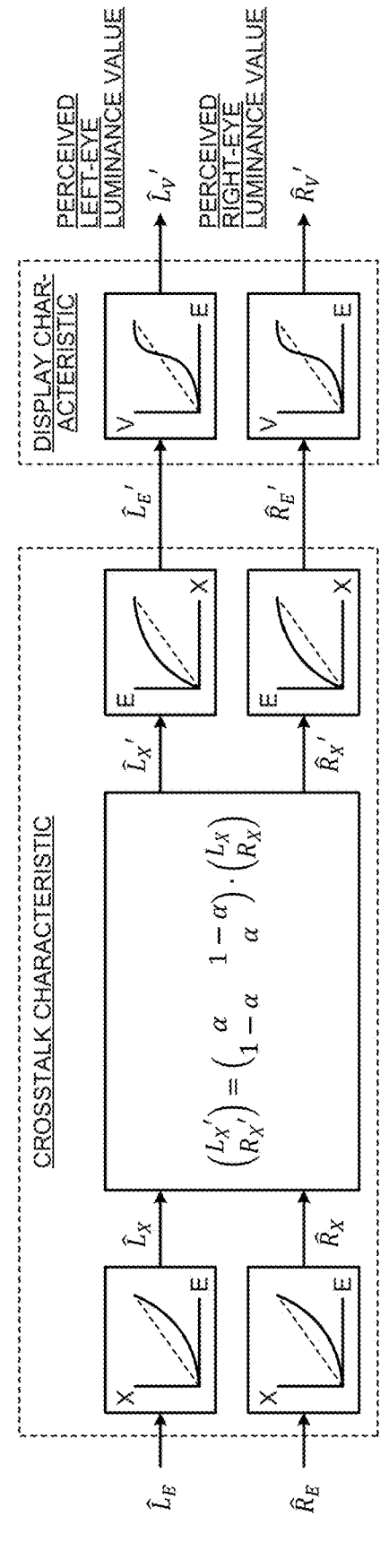
FIG. 3 is a diagram continuously illustrating a process of crosstalk correction and crosstalk deterioration.

FIG. 3 is a diagram continuously illustrating a process of crosstalk correction and crosstalk deterioration.

By combining the crosstalk correction and the crosstalk deterioration, the gradation conversion characteristics of the above (A) and (F) are canceled out, and the mixing characteristics of the above (B) and (E) are canceled out. As a result, a left-eye level and a right-eye level after the gradation conversion processing of the above (D) and a left-eye level and a right-eye level after the mixing processing of the above (B) match as shown in the following Formula (5). Therefore, video without crosstalk deterioration is perceived.

$$\begin{pmatrix} \hat{L}_X' \\ \hat{R}_X' \end{pmatrix} = \begin{pmatrix} \alpha & 1-\alpha \\ 1-\alpha & \alpha \end{pmatrix} \cdot \begin{pmatrix} \hat{L}_X \\ \hat{R}_X \end{pmatrix} \quad (5)$$

$$= \begin{pmatrix} \alpha & 1-\alpha \\ 1-\alpha & \alpha \end{pmatrix} \cdot \begin{pmatrix} \alpha & 1-\alpha \\ 1-\alpha & \alpha \end{pmatrix}^{-1} \cdot \begin{pmatrix} L_X \\ R_X \end{pmatrix}$$

$$= \begin{pmatrix} L_X \\ R_X \end{pmatrix}$$

[1-3. Crosstalk Parameter Calculation Method]

Figure 4:
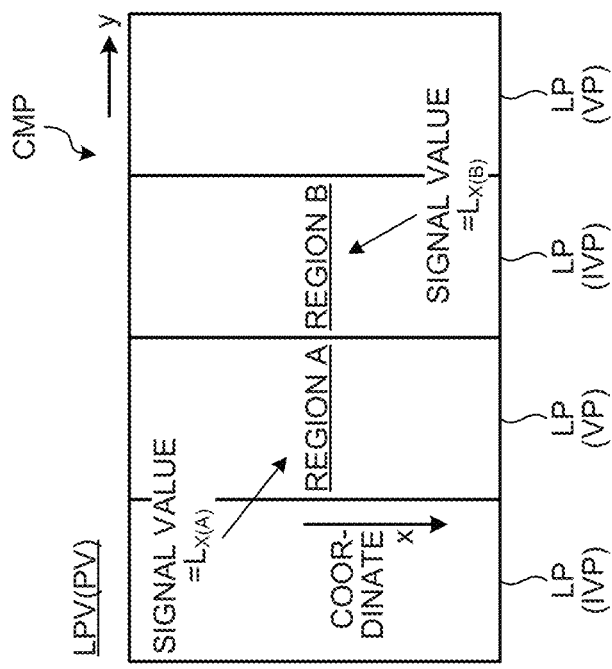
FIG. 4 is a diagram illustrating an example of a method of calculating a crosstalk parameter.

FIG. 4 is a diagram illustrating an example of a method of calculating the crosstalk parameter 23.

The crosstalk model 21 includes, for example, a gradation characteristic and a mixing characteristic as deterioration characteristics. Therefore, the gradation conversion coefficient γ indicating a gradation characteristic and the mixing ratio α indicating a mixing characteristic are calculated as the crosstalk parameter 23.

When the two crosstalk parameters 23 of the mixing ratio α and the gradation conversion coefficient γ are adjusted after a gradation characteristic (E→V) of the display is measured, a lot of measurements are required to calculate luminance. In addition, when a perceived luminance value has a measurement error, the crosstalk parameter 23 cannot be accurately calculated. Therefore, in the present disclosure, the crosstalk parameter 23 is calculated on the basis of a luminance difference between adjacent patterns (a relative value of the luminance) without depending on an absolute value of the luminance.

A crosstalk measurement pattern CMP includes a plurality of viewpoint images PV corresponding to different viewpoints. The plurality of viewpoint images PV include, for example, a left-eye image LPV and a right-eye image RPV. In crosstalk measurement, luminance of the crosstalk measurement pattern CMP displayed on the display is measured. In a field sequential system display, the plurality of viewpoint images PV are alternately displayed at constant time intervals. In a parallax system display and a lenticular system display, the plurality of viewpoint images PV are combined in the same screen and displayed. In the present embodiment, for example, the plurality of viewpoint images PV are alternately displayed by the field sequential system.

Each viewpoint image PV has a plurality of line patterns LP arranged in the parallax direction (y direction). The plurality of line patterns LP include a plurality of variable patterns VP and a plurality of invariable patterns IVP. The variable pattern VP is a line pattern LP having a different signal value depending on a position in a longitudinal direction (x direction) orthogonal to the parallax direction. The invariable pattern IVP is a line pattern LP having a constant signal value in the entire longitudinal direction.

In one viewpoint image PV, the plurality of variable patterns VP are periodically arranged in the parallax direction at intervals of two line patterns LP equal to the number of viewpoints. The line patterns LP other than the variable patterns VP are invariable patterns IVP. In a case where a position of the line pattern LP in the parallax direction is represented by the number (line number) of the line pattern LP counted from an end (e.g., an image end having the minimum y coordinate) of the viewpoint image PV, a position of the variable pattern VP in the parallax direction varies with each viewpoint image PV.

When a coordinate in the longitudinal direction is set as x and a signal value of the variable pattern VP at the coordinate x is set as P(x), the signal value P(x) is a monotonic function. In viewpoint images of two adjacent viewpoints, a direction in which the signal value P(x) of the variable pattern VP increases or decreases is opposite to each other. A sum of the signal values P(x) of the variable patterns VP of the viewpoint images PV of the two adjacent viewpoints is constant, for example, regardless of the coordinates x.

In the example of FIG. 4, each region extending in the x direction is the line pattern LP. For example, in the left-eye image LPV, a region A is a variable pattern VP, and a region B is an invariable pattern IVP. In the right-eye image RPV, the region A is an invariable pattern IVP, and the region B is a variable pattern VP. Line numbers of the region A and the region B of the left-eye image LPV are equal to line numbers of the region A and the region B of the right-eye image RPV. In one viewpoint image PV, the plurality of variable patterns VP and the plurality of invariable patterns IVP are alternately disposed in the parallax direction. The viewpoint images PV of two adjacent viewpoints are different in an order in which the variable pattern VP and the invariable pattern IVP are arranged.

A signal value $L_{E(A)}$ of the region A of the left-eye image LPV, a signal value $L_{E(B)}$ of the region B of the left-eye image LPV, a signal value $R_{E(A)}$ of the region A of the right-eye image RPV, and a signal value $R_{E(B)}$ of the region B of the right-eye image RPV are expressed as, for example, the following Formula (6).

$$\begin{pmatrix} L_{E(A)} \\ R_{E(A)} \end{pmatrix} = \begin{pmatrix} x \\ 0 \end{pmatrix} \qquad (6)$$

$$\begin{pmatrix} L_{E(B)} \\ R_{E(B)} \end{pmatrix} = \begin{pmatrix} C \\ 1-x \end{pmatrix}$$

The signal values of Formula (6) are normalized with 1 as a maximum value of the signal value. C is a constant of 0 or more and 1 or less. Although in the example of Formula (6), the signal value $R_{E(A)}$ of the region A of the right-eye image RPV is 0, the signal value $R_{E(A)}$ may be a constant other than 0. In crosstalk measurement, a plurality of crosstalk measurement patterns CMP are generated in which combinations of signal values of the invariable patterns IVP of the respective viewpoint images PV are made different.

Figure 5:
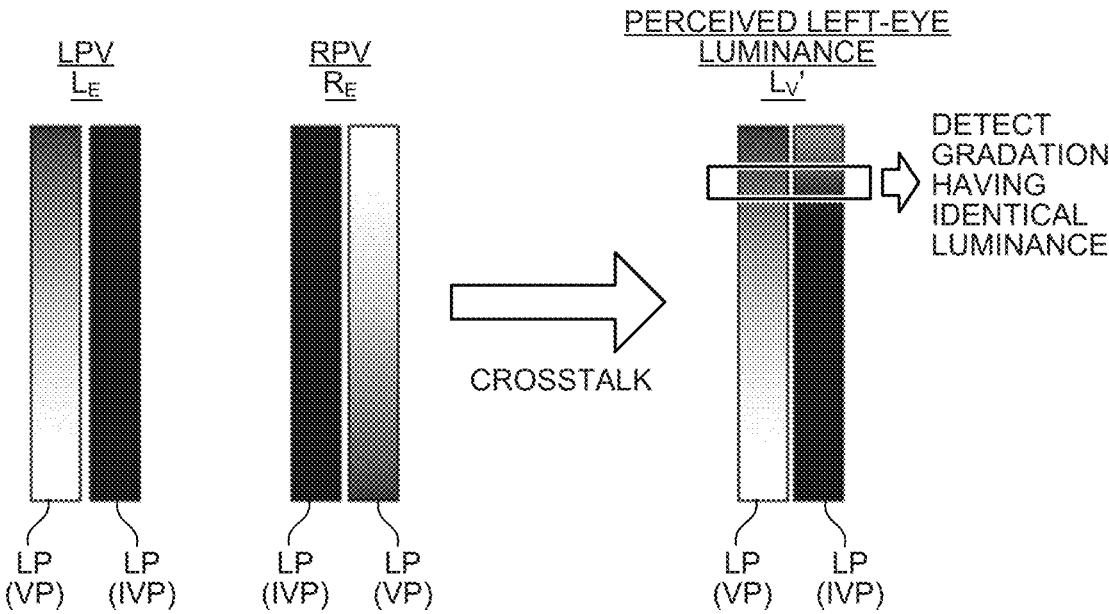
FIG. 5 is a diagram illustrating an example of a method of measuring crosstalk.

FIG. 5 is a diagram illustrating an example of a method of measuring crosstalk.

The crosstalk measurement pattern CMP is observed through the display. A luminance distribution of the crosstalk measurement pattern CMP not to be subjected to the crosstalk correction processing is different from a luminance distribution estimated from the signal value. A deviation of the luminance distribution is caused by crosstalk. For example, although in the example of FIG. 5, the signal value $L_{E(B)}$ of the region B of the left-eye image LPV is the constant C, a left-eye luminance value $L_{V(B)}'$ perceived through the display has a gradient in the longitudinal direction (x direction). This gradient is caused by interference (crosstalk) with the region B of the right-eye image RPV.

In the present disclosure, in order to examine a magnitude of crosstalk, for example, a position (coordinate x) at which the variable pattern VP and the invariable pattern IVP are observed to have the same luminance in the same viewpoint image PV is detected as the identical luminance position. At the identical luminance position, a relationship of the following Formula (7) is established.

$$L_{V(A)}' = L_{V(B)}' \Leftrightarrow L_{E(A)}' = L_{E(B)}' \qquad (7)$$

$$\Leftrightarrow L_{X(A)}' = L_{X(B)}'$$

A signal value at the identical luminance position is expressed by the following Formulas (8) and (9). Coordinates of the identical luminance position are expressed to have a bar attached above the coordinates x.

$$\begin{pmatrix} L_{X(A)}' \\ R_{X(A)}' \end{pmatrix} = \begin{pmatrix} \alpha & 1-\alpha \\ 1-\alpha & \alpha \end{pmatrix} \cdot \begin{pmatrix} L_{X(A)} \\ R_{X(A)} \end{pmatrix} = \begin{pmatrix} \alpha & 1-\alpha \\ 1-\alpha & \alpha \end{pmatrix} \cdot \begin{pmatrix} L_{E(A)}^{\gamma} \\ R_{X(A)}^{\gamma} \end{pmatrix} \qquad (8)$$

$$= \begin{pmatrix} \alpha & 1-\alpha \\ 1-\alpha & \alpha \end{pmatrix} \cdot \begin{pmatrix} \bar{x}^{\gamma} \\ 0 \end{pmatrix}$$

$$\begin{pmatrix} L_{X(B)}' \\ R_{X(B)}' \end{pmatrix} = \begin{pmatrix} \alpha & 1-\alpha \\ 1-\alpha & \alpha \end{pmatrix} \cdot \begin{pmatrix} L_{X(B)} \\ R_{X(B)} \end{pmatrix} = \begin{pmatrix} \alpha & 1-\alpha \\ 1-\alpha & \alpha \end{pmatrix} \cdot \begin{pmatrix} L_{E(B)}^{\gamma} \\ R_{X(B)}^{\gamma} \end{pmatrix} \qquad (9)$$

$$= \begin{pmatrix} \alpha & 1-\alpha \\ 1-\alpha & \alpha \end{pmatrix} \cdot \begin{pmatrix} C^{\gamma} \\ (1-\bar{x})^{\gamma} \end{pmatrix}$$

By substituting Formulas (8) and (9) into Formula (7), the following Formula (10) is obtained.

$$L_{X(A)}' = L_{X(B)}' \qquad (10)$$

$$\Leftrightarrow \alpha \cdot \bar{x}^{\gamma} = \alpha \cdot C^{\gamma} + (1-\alpha) \cdot (1-\bar{x})^{\gamma}$$

$$\Leftrightarrow \alpha = \frac{(1-\bar{x})^{\gamma}}{\bar{x}^{\gamma} + (1-\bar{x})^{\gamma} - C^{\gamma}}$$

Figure 7:
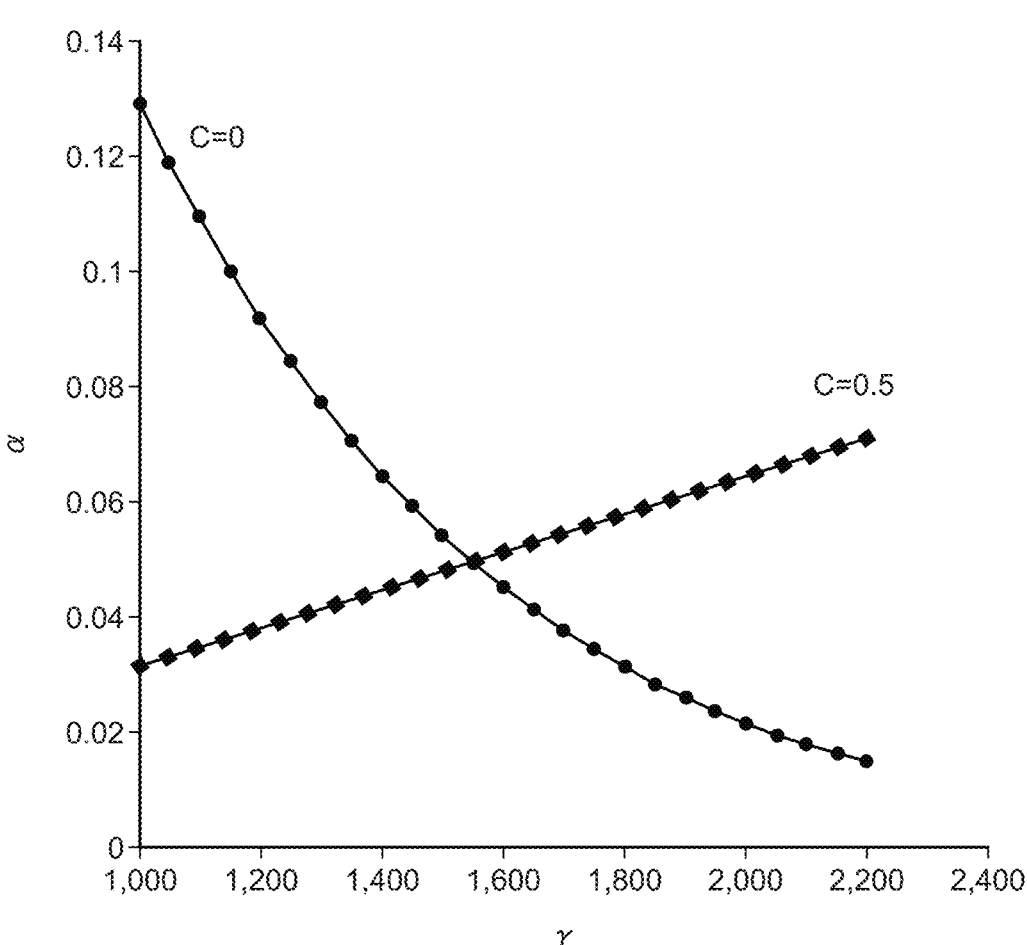
FIG. 7 is a graph showing a relationship between a gradation conversion coefficient and a mixing ratio.
Figure 8:
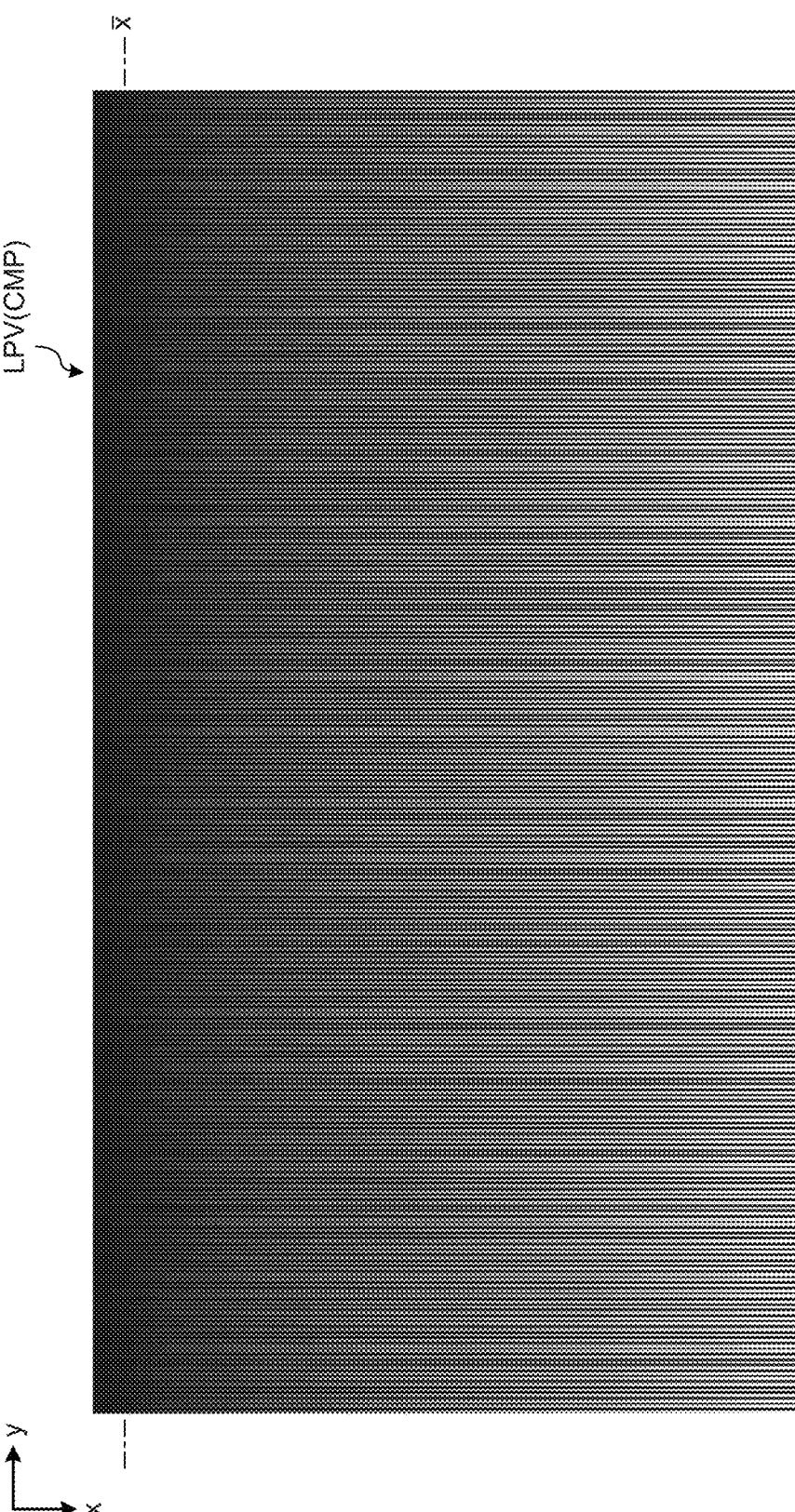
FIG. 8 is a view illustrating an example of a left-eye image.
Figure 9:
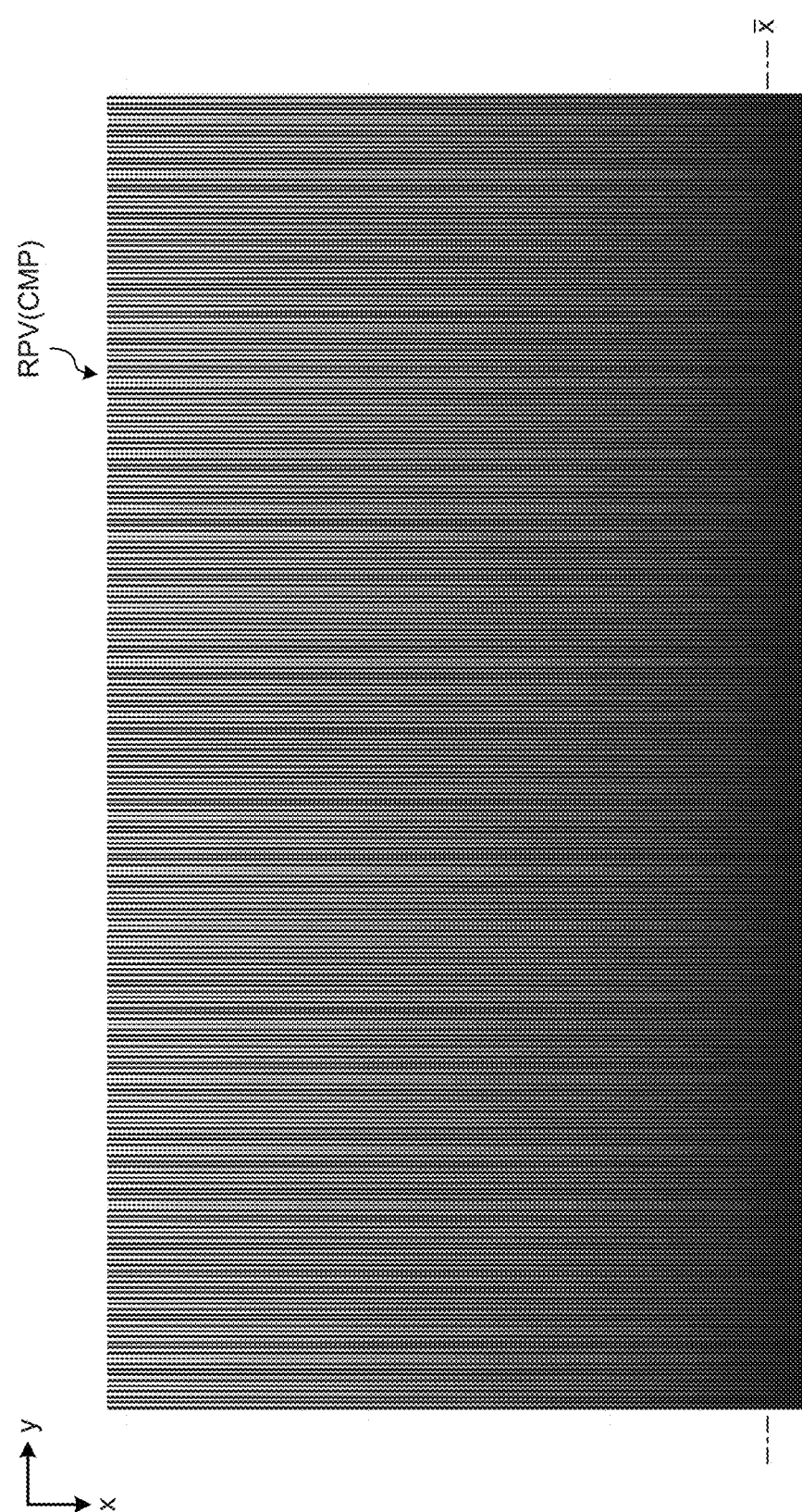
FIG. 9 is a view illustrating an example of a right-eye image.

FIG. 6 is a graph showing coordinate dependency of the left-eye level $L_{X}'$ after crosstalk. The left side of FIG. 6 shows a graph in a case of C=0. The right side of FIG. 6 shows a graph in a case of C=0.5. FIG. 7 is a graph showing a relationship between the gradation conversion coefficient $\gamma$ and the mixing ratio $\alpha$ in the case of C=0 and the case of C=0.5. FIG. 8 is a view illustrating an example of the left-eye image LPV in the case of C=0. FIG. 9 is a view illustrating an example of the right-eye image RPV in the case of C=0.5.

Luminance is measured for the plurality of crosstalk measurement patterns CMP with different values of the constant C. By this measurement, a plurality of relational expressions between the gradation conversion coefficient $\gamma$ and the mixing ratio $\alpha$ are generated. By combining these relational expressions, values of the gradation conversion coefficient $\gamma$ and the mixing ratio $\alpha$ are obtained.

A value of each crosstalk parameter 23 is obtained by at least as many simultaneous relational expressions as the number of the crosstalk parameters 23. However, when a calculated value varies with each measurement due to disturbance or the like, the number of simultaneous relational expressions can be increased to calculate a plurality of parameter values for each crosstalk parameter 23. By calculating an average value of the plurality of parameter values as the value of the crosstalk parameter 23, an influence of an error included in each parameter value is suppressed.

2. First Embodiment

[2-1. Configuration of Information Processing Device]

Figure 10:
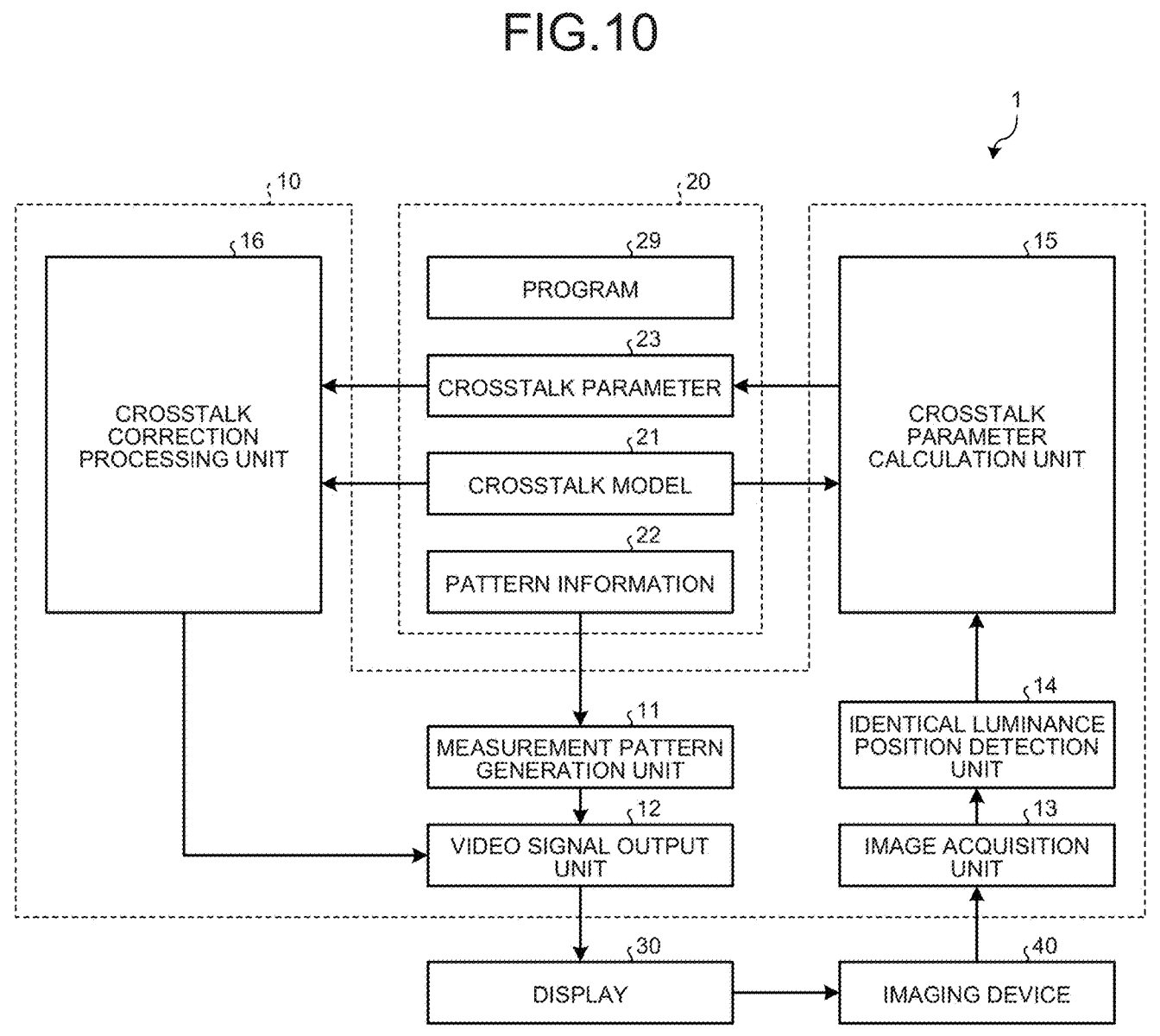

FIG. 10 is a schematic diagram of the information processing device 1 according to the first embodiment. The crosstalk correction processing of the present disclosure is performed using the information processing device 1. The information processing device 1 includes, for example, a processing device 10, a storage device 20, a display 30, and an imaging device 40.

The processing device 10 includes a measurement pattern generation unit 11, a video signal output unit 12, an image acquisition unit 13, an identical luminance position detection unit 14, a crosstalk parameter calculation unit 15, and a crosstalk correction processing unit 16.

The measurement pattern generation unit 11 generates the crosstalk measurement pattern CMP on the basis of pattern information 22. The pattern information 22 includes, for example, information on the crosstalk measurement pattern CMP. On the basis of the pattern information 22, the measurement pattern generation unit 11 generates a plurality of crosstalk measurement patterns CMP in which combinations of signal values of the invariable patterns IVP are made different.

The video signal output unit 12 converts the crosstalk measurement pattern CMP into a video signal and outputs the video signal to the display 30. As the display 30, a known display such as a liquid crystal display (LCD) or an organic light emitting diode (OLED) is used.

The crosstalk measurement pattern CMP displayed on the display 30 is imaged by the imaging device 40. The imaging device 40 includes an image sensor such as a charge coupled device image sensor (CCD) or a complementary metal oxide semiconductor (CMOS).

The image acquisition unit 13 acquires the captured image of the crosstalk measurement pattern CMP from the imaging device 40. For example, only a captured image of one viewpoint image PV among the plurality of viewpoint images PV included in the crosstalk measurement pattern CMP is used for the operation of the crosstalk parameter 23. For example, the image acquisition unit 13 selectively acquires only a captured image of one viewpoint image PV from the imaging device 40. In the example of FIG. 5, the crosstalk parameter 23 is calculated on the basis of the left-eye luminance value $L_{l'}$. Therefore, only the captured image of the left-eye image LPV is selectively acquired by the image acquisition unit 13.

The identical luminance position detection unit 14 analyzes the captured image to detect a position (coordinate x) at which the variable pattern VP and the invariable pattern IVP are observed to have the identical luminance in the same viewpoint image PV as the identical luminance position. The identical luminance position is detected as, for example, a position where a luminance difference between the variable pattern VP and the invariable pattern IVP is equal to or less than a threshold. The identical luminance position detection unit 14 detects an identical luminance position for each crosstalk measurement pattern CMP.

The crosstalk parameter calculation unit 15 applies the measurement result of the crosstalk measurement pattern CMP to the crosstalk model 21 including the plurality of deterioration characteristics, and calculates the crosstalk parameter 23 set for each deterioration characteristic. The plurality of deterioration characteristics include, for example, a gradation characteristic and a mixing characteristic. The crosstalk parameter calculation unit 15 calculates, as the crosstalk parameter 23, the gradation conversion coefficient $\gamma$ indicating the gradation characteristic and the mixing ratio $\alpha$ indicating the mixing characteristic.

For example, the crosstalk parameter calculation unit 15 applies a measurement result regarding a luminance difference between the line patterns LP in the same viewpoint image PV to the crosstalk model 21. In the example of FIG. 5, the identical luminance position detected on the basis of the luminance difference between the variable pattern VP and the invariable pattern IVP of the left-eye image LPV is used for the operation of the crosstalk parameter 23. The crosstalk parameter calculation unit 15 applies the measurement result of the identical luminance position measured for each crosstalk measurement pattern CMP to the crosstalk model 21.

The crosstalk parameter calculation unit 15 is capable of statistically calculating the crosstalk parameter 23 using a large number of crosstalk measurement patterns CMP. For example, the measurement pattern generation unit 11 generates the number of crosstalk measurement patterns CMP larger than the number of the crosstalk parameters 23. The crosstalk parameter calculation unit 15 calculates a plurality of parameter values for each crosstalk parameter 23. The crosstalk parameter calculation unit 15 calculates an average value of the plurality of parameter values as the value of the crosstalk parameter 23.

A weight can be set for each of the plurality of parameter values. For example, the crosstalk parameter calculation unit 15 calculates a weighted average of the plurality of parameter values on the basis of the weight set for each crosstalk measurement pattern CMP. The crosstalk parameter calculation unit 15 outputs the calculated weighted average as a value of the crosstalk parameter 23. Information on a weight is included in the pattern information 22.

The crosstalk correction processing unit 16 corrects the video signal input from an external apparatus on the basis of the crosstalk parameter 23 calculated by the crosstalk parameter calculation unit 15. The video signal after the crosstalk correction processing is output to the display 30 via the video signal output unit 12. Consequently, the video with crosstalk suppressed is displayed on the display 30.

The storage device 20 stores, for example, the crosstalk model 21, the pattern information 22, the crosstalk parameter 23, and a program 29. The program 29 is a program that causes a computer to execute information processing according to the present disclosure. The processing device 10 performs various processing according to the program 29 stored in the storage device 20. The storage device 20 may be used as a working region for temporarily storing a processing result of the processing device 10. The storage device 20 includes any non-transitory storage medium, such as, for example, a semiconductor storage medium and a magnetic storage medium. The storage device 20 includes, for example, an optical disk, a magneto-optical disk, or a flash memory. The program 29 is stored in, for example, a non-transitory computer-readable storage medium.

The processing device 10 is, for example, a computer including a processor and a memory. The memory of the processing device 10 includes a random access memory (RAM) and a read only memory (ROM). By executing the program 29, the processing device 10 functions as the measurement pattern generation unit 11, the video signal output unit 12, the image acquisition unit 13, the identical luminance position detection unit 14, the crosstalk parameter calculation unit 15, and the crosstalk correction processing unit 16.

[2-2. Information Processing Method]

Figure 11:
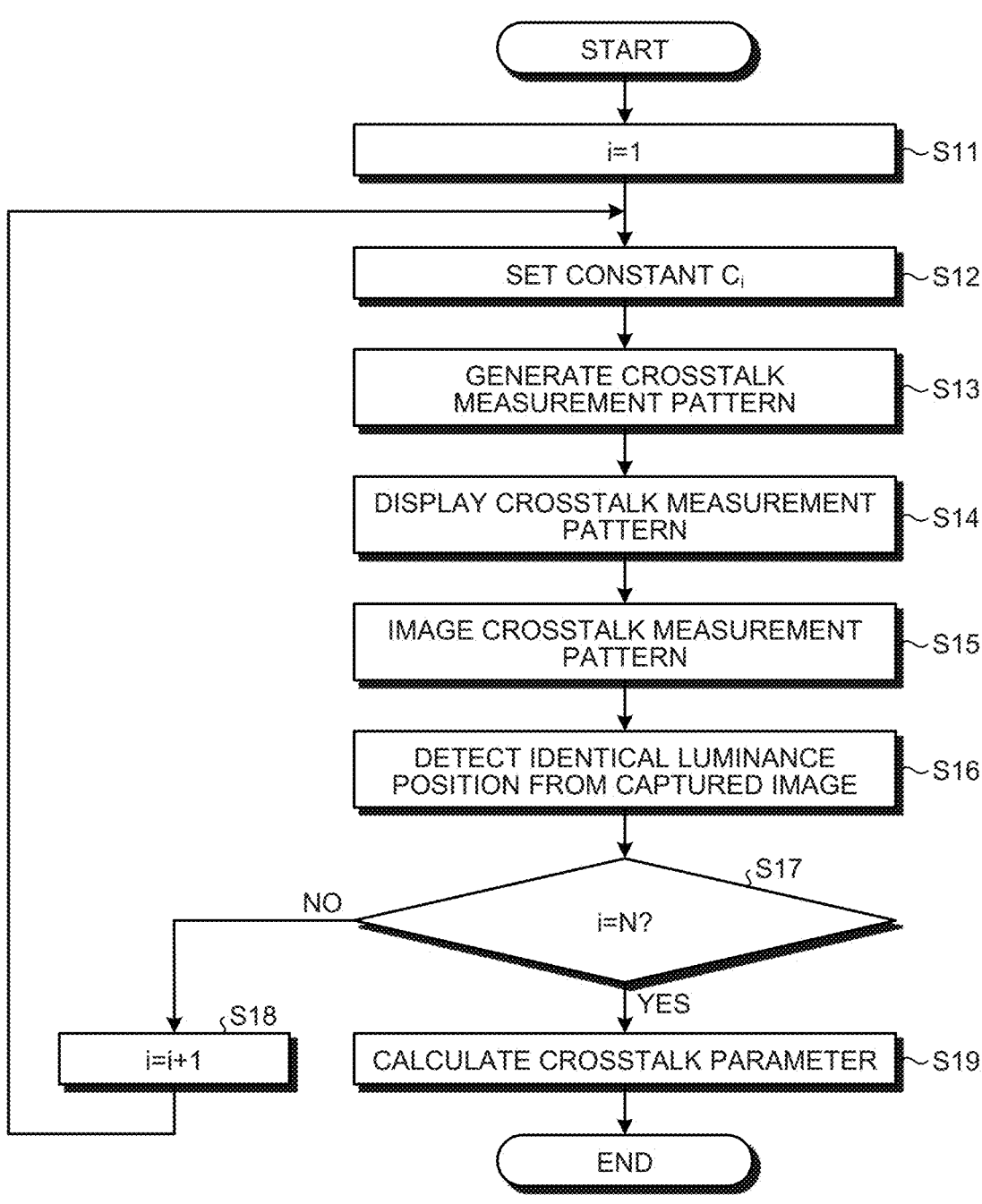
FIG. 11 is a flowchart illustrating an example of information processing.

FIG. 11 is a flowchart illustrating an example of the information processing of the present disclosure. FIG. 11 illustrates an example of processing of calculating the crosstalk parameter 23 of the 3D video described with reference to FIG. 5.

In Step S11, the measurement pattern generation unit 11 sets a variable i to 1. The variable i indicates the number of the crosstalk measurement pattern CMP. Hereinafter, the i-th crosstalk measurement pattern CMP is described as a crosstalk measurement pattern $CMP_i$.

In Step S12, the measurement pattern generation unit 11 sets a constant $C_i$ of the crosstalk measurement pattern $CMP_i$. The constant $C_i$ is the signal value $L_{E(B)}$ of the region B (invariable pattern IVP) of the left-eye image LPV. A value of the constant $C_i$ is defined in the pattern information 22.

In Step S13, the measurement pattern generation unit 11 generates the crosstalk measurement pattern $CMP_i$ using Formula (6) and outputs the crosstalk measurement pattern $CMP_i$ to the video signal output unit 12.

In Step S14, the video signal output unit 12 causes the display 30 to display the crosstalk measurement pattern $CMP_i$.

In Step S15, the imaging device 40 images the crosstalk measurement pattern $CMP_i$ displayed on the display 30. For example, the imaging device 40 selectively images only the left-eye image LPV out of the left-eye image LPV and the right-eye image RPV included in the crosstalk measurement pattern $CMP_i$. The imaging device 40 outputs the captured image to the image acquisition unit 13.

In Step S16, the identical luminance position detection unit 14 acquires the captured image of the left-eye image LPV from the image acquisition unit 13. The identical luminance position detection unit 14 detects an identical luminance position at which the region A and the region B are observed to have the identical luminance from the captured image. The identical luminance position detection unit 14 outputs the detected identical luminance position of the crosstalk measurement pattern CMP$_i$ to the crosstalk parameter calculation unit 15.

In Step S17, the measurement pattern generation unit 11 determines whether the variable i is N or not. N is the number of crosstalk measurement patterns CMP to be measured. The number N is defined in the pattern information 22.

In a case where it is not determined in Step S17 that the variable i is N (Step S17: No), the process proceeds to Step S18. In Step S18, the measurement pattern generation unit 11 adds 1 to the variable i and returns to Step S12. Then, the processing from Step S12 to Step S17 is repeated until the variable i becomes equal to N.

In a case where it is determined in Step S17 that the variable i is N (Step S17: Yes), the process proceeds to Step S19. In Step S19, the crosstalk parameter calculation unit 15 calculates the gradation conversion coefficient γ and the mixing ratio α on the basis of the identical luminance position detected for each crosstalk measurement pattern CMP.

[2-3. Effects]

The information processing device 1 has the measurement pattern generation unit 11 and the crosstalk parameter calculation unit 15. The measurement pattern generation unit 11 generates the crosstalk measurement pattern CMP. The crosstalk parameter calculation unit 15 applies the measurement result of the crosstalk measurement pattern CMP to the crosstalk model 21 including the plurality of deterioration characteristics, and calculates the crosstalk parameter 23 set for each deterioration characteristic. In the information processing method of the present embodiment, the processing of the information processing device 1 described above is executed by a computer. The program 29 of the present embodiment causes a computer to realize the processing of the information processing device 1 described above.

According to this configuration, it is possible to correct crosstalk in consideration of various deterioration characteristics. Therefore, crosstalk is favorably suppressed.

The plurality of deterioration characteristics include the gradation characteristic indicating gradation dependency of crosstalk and the mixing characteristic indicating a degree of interference between the viewpoint images PV. The crosstalk parameter calculation unit 15 respectively calculates, as the crosstalk parameter 23, the gradation conversion coefficient γ indicating the gradation characteristic and the mixing ratio α indicating the mixing characteristic.

According to this configuration, not only the mixing characteristic of the crosstalk but also the gradation characteristic is measured. Since correction can be performed in consideration of the gradation characteristic of the crosstalk, accuracy of the correction is enhanced.

A crosstalk measurement pattern CMP includes a plurality of viewpoint images PV corresponding to different viewpoints. Each viewpoint image PV has the plurality of line patterns LP arranged in the parallax direction. The crosstalk parameter calculation unit 15 acquires information regarding a luminance difference between the line patterns LP in the same viewpoint image PV as a measurement result. The crosstalk parameter calculation unit 15 applies the measurement result of the luminance difference between the line patterns LP in the same viewpoint image PV to the crosstalk model 21.

According to this configuration, the crosstalk parameter 23 is calculated on the basis of a relative value of luminance of each line pattern LP. Since it is not necessary to accurately measure an absolute value of the luminance, disturbance such as external light hardly affects an operation result of the crosstalk parameter 23. In addition, as a result of an image output, the crosstalk parameter is calculated on the basis of a combination of signal values by which a luminance level difference is reduced. Therefore, in video after the crosstalk correction processing, the problem of a luminance level difference, which is the most problematic about crosstalk, hardly occurs.

The plurality of line patterns LP include a plurality of variable patterns VP and a plurality of invariable patterns IVP. The variable pattern VP is a line pattern LP having a different signal value depending on a position in the longitudinal direction orthogonal to the parallax direction. The invariable pattern IVP is a line pattern LP having a constant signal value in the entire longitudinal direction. The position of the variable pattern VP in the parallax direction varies with each viewpoint image PV. When the coordinate in the longitudinal direction is set as x and the signal value of the variable pattern at the coordinate x is set as P(x), the signal value P(x) is a monotonic function. In viewpoint images PV of two adjacent viewpoints, a direction in which the signal value P(x) of the variable pattern VP increases or decreases is opposite to each other.

According to this configuration, the variable pattern VP of each viewpoint image PV strongly interferes with the invariable pattern IVP of the viewpoint image PV of the adjacent viewpoint. The signal value of the variable pattern VP changes monotonically. Therefore, in the invariable pattern IVP, a gradient of luminance along the longitudinal direction is generated by interference (crosstalk) with the variable pattern VP. Due to this gradient, a distribution of luminance differences between the line patterns LP in the same viewpoint image PV slides in the longitudinal direction. The crosstalk information is strongly reflected on a slide amount of the distribution. By examining the slide amount of the distribution, the crosstalk parameter 23 is accurately calculated.

The measurement pattern generation unit 11 generates a plurality of crosstalk measurement patterns CMP in which combinations of signal values of the invariable patterns IVP are made different. The crosstalk parameter calculation unit 15 applies, to the crosstalk model 21, the measurement result for the coordinate x at which the luminance difference is equal to or less than the threshold value, the measurement result being measured for each of the crosstalk measurement patterns CMP.

According to this configuration, the slide amount of the distribution of the luminance differences is grasped on the basis of the coordinate x at which the luminance difference is equal to or less than the threshold. The luminance difference gradually changes along the longitudinal direction, and a human eye has high sensitivity to a luminance difference of adjacent regions, so that the visual measurement can be performed.

The measurement pattern generation unit 11 generates the number of crosstalk measurement patterns larger than the number of the crosstalk parameters 23. The crosstalk parameter calculation unit 15 calculates the plurality of parameter values for each crosstalk parameter 23 according to the number of the crosstalk measurement patterns CMP. The crosstalk parameter calculation unit 15 calculates an average value of the plurality of parameter values as the value of the crosstalk parameter 23.

According to this configuration, the influence of the error included in each parameter value is suppressed.

The crosstalk parameter calculation unit 15 calculates a weighted average of the plurality of parameter values on the basis of a weight set for each crosstalk measurement pattern CMP. The crosstalk parameter calculation unit 15 outputs the calculated weighted average as a value of the crosstalk parameter 23.

According to this configuration, crosstalk of a specific gradation according to a weight is favorably suppressed. In a case where an image with uneven gradation such as a dark image or a bright image is displayed, an image with less crosstalk is provided by adjusting the weight according to the unevenness.

[2-4. Modification 1]

In the first embodiment described above, the example in which a signal value of the variable pattern VP varies according to a display position has been described. However, a form of variation of the signal value is not limited thereto. The signal value of the variable pattern VP may vary according to display time.

For example, the variable pattern VP is a line pattern LP in which a signal value varies depending on time. The invariable pattern IVP is a line pattern LP having a constant signal value regardless of time. When measurement time is set as t and the signal value of the variable pattern VP at the time t is set as $Q(t)$, the signal value $Q(t)$ is a monotonic function. In viewpoint images PV of two adjacent viewpoints, a direction in which the signal value $Q(t)$ of the variable pattern VP increases or decreases is opposite to each other.

According to this configuration, the variable pattern VP of each viewpoint image PV strongly interferes with the invariable pattern IVP of the viewpoint image PV of the adjacent viewpoint. The signal value of the variable pattern VP changes monotonically. Therefore, luminance of the invariable pattern IVP changes with time due to interference (crosstalk) with the variable pattern VP. Due to this change in luminance, a luminance difference between the line patterns LP in the same viewpoint image PV also changes with time. The crosstalk information is strongly reflected on an amount of change in a luminance difference. By examining the amount of change in a luminance difference, the crosstalk parameter 23 is accurately calculated.

In the present modification, the measurement pattern generation unit 11 generates a plurality of crosstalk measurement patterns CMP in which combinations of signal values of the invariable patterns IVP are made different. The crosstalk parameter calculation unit 15 applies, to the crosstalk model 21, the measurement result for the time t at which the luminance difference is equal to or less than the threshold value, the measurement result being measured for each of the crosstalk measurement patterns CMP.

According to this configuration, the amount of change in a luminance difference is grasped on the basis of the time t at which the luminance difference is equal to or less than the threshold. The luminance difference gradually changes with time, and a human eye has high sensitivity to the luminance difference of the adjacent regions, so that the visual measurement can be performed.

[2-5. Modification 2]

Figure 12:
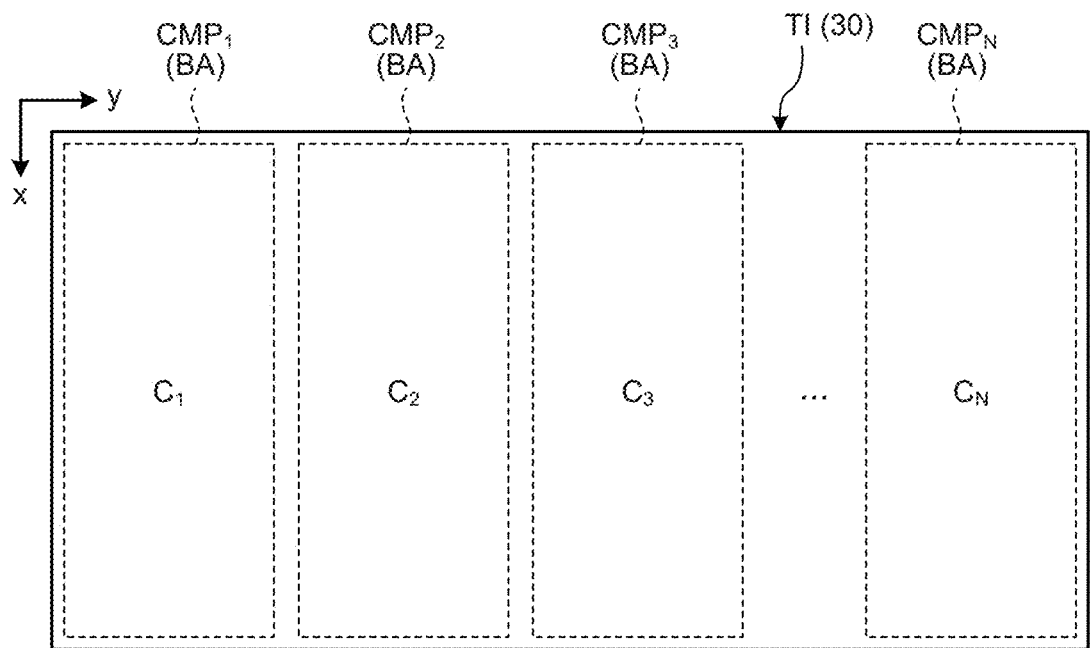
FIG. 12 is an explanatory diagram of Modification 2.

FIG. 12 is an explanatory diagram of Modification 2.

The measurement pattern generation unit 11 generates a single test image TI in which a plurality of crosstalk measurement patterns CMP are incorporated in the same screen. The test image TI has the same number of block regions BA as the number N of the crosstalk measurement patterns CMP. In each block region BA, crosstalk measurement patterns CMP having different constants C are disposed. The imaging device 40 images the plurality of crosstalk measurement patterns CMP having different constants C in one shot.

In the first embodiment described above, the plurality of crosstalk measurement patterns CMP are separately displayed. Therefore, generation, display, and measurement of the crosstalk measurement patterns CMP are performed a plurality of times. By contrast, in the present modification, all the crosstalk measurement patterns CMP are measured by one-shot imaging. Therefore, the measurement time is shortened.

[2-6. Modification 3]

Figure 13:
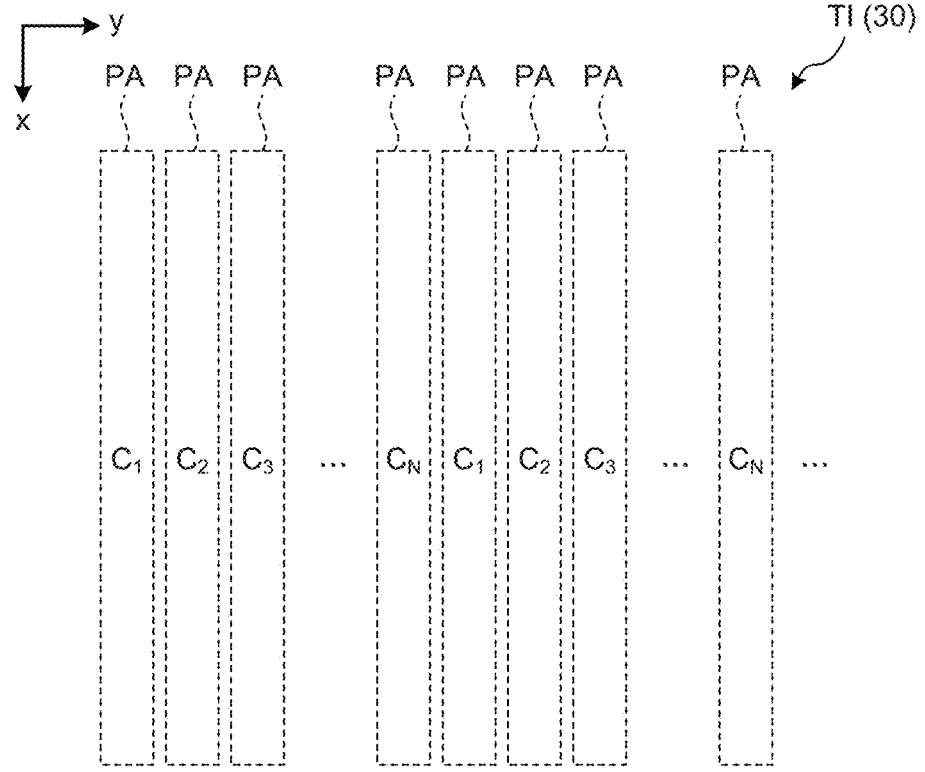
FIG. 13 is an explanatory diagram of Modification 3.

FIG. 13 is an explanatory diagram of Modification 3.

In the present modification, similarly to Modification 2, a plurality of crosstalk measurement patterns CMP are incorporated into a single test image TI. In Modification 2, the test image TI is divided into the same number of the block regions BA as the number N of the crosstalk measurement patterns CMP, and the crosstalk measurement patterns CMP having different constants C are allocated to the respective block regions BA. By contrast, the measurement pattern generation unit 11 of the present modification allocates the plurality of crosstalk measurement patterns CMP to pixels of different colors.

For example, the display 30 has a plurality of pixel rows PA extending in the x direction. One pixel row PA includes a plurality of pixels to which the same color is allocated. On the display 30, a plurality of the pixel rows PA to which different colors are allocated are alternately disposed in the y direction. The plurality of crosstalk measurement patterns CMP are allocated to the pixel rows PA of different colors. The plurality of line patterns LP belonging to the same crosstalk measurement pattern CMP are distributed and displayed in the plurality of pixel rows PA to which the same color is allocated. According to this configuration, a spatial density of the crosstalk measurement is increased.

[2-7. Modification 4]

Figure 14:
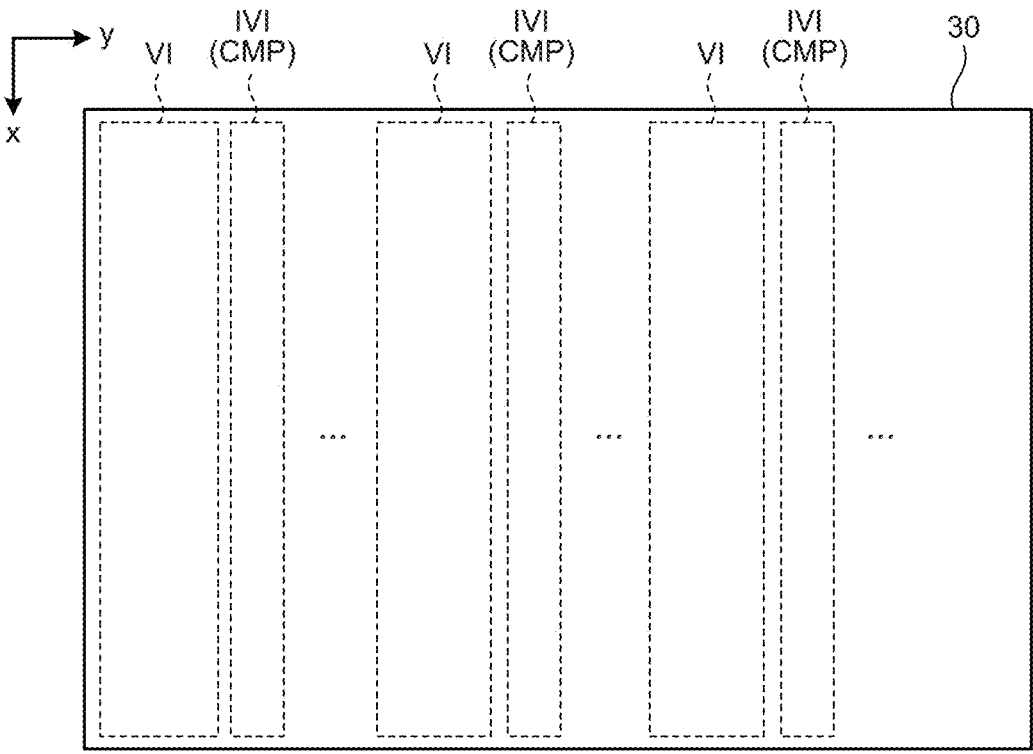
FIG. 14 is an explanatory diagram of Modification 4.

FIG. 14 is an explanatory diagram of Modification 4.

The measurement pattern generation unit 11 of the present modification generates the crosstalk measurement pattern CMP as an invisible pattern IVI to be incorporated in a visible light image VI. The display 30 is, for example, a projector including a visible light source and an infrared ray (IR) light source, and the crosstalk measurement pattern CMP is displayed using the IR light source. According to this configuration, it is possible to measure crosstalk while displaying the visible light image VI. Since real-time measurement is possible, correction following a dynamic change of crosstalk is possible.

[2-8. Modification 5]

In the first embodiment described above, the case where the crosstalk model 21 includes a plurality of deterioration characteristics has been described. However, the method of calculating the crosstalk parameter 23 on the basis of a luminance difference between adjacent patterns can also be applied to a crosstalk model other than the crosstalk model 21 described above, i.e., to the crosstalk model 21 including any number, one or more, of deterioration characteristics. For example, the above-described method can also be applied to a conventional crosstalk model not taking gradation characteristics into consideration. In this case, the crosstalk parameter is only the mixing ratio $\alpha$, and the gradation conversion coefficient $\gamma$ is a preset fixed value.

Also in this case, the crosstalk measurement pattern CMP based on Formula (6) can be generated, and the crosstalk parameter 23 can be calculated on the basis of Formula (10).

3. Second Embodiment

[3-1. Configuration of Information Processing Device]

Figure 15:
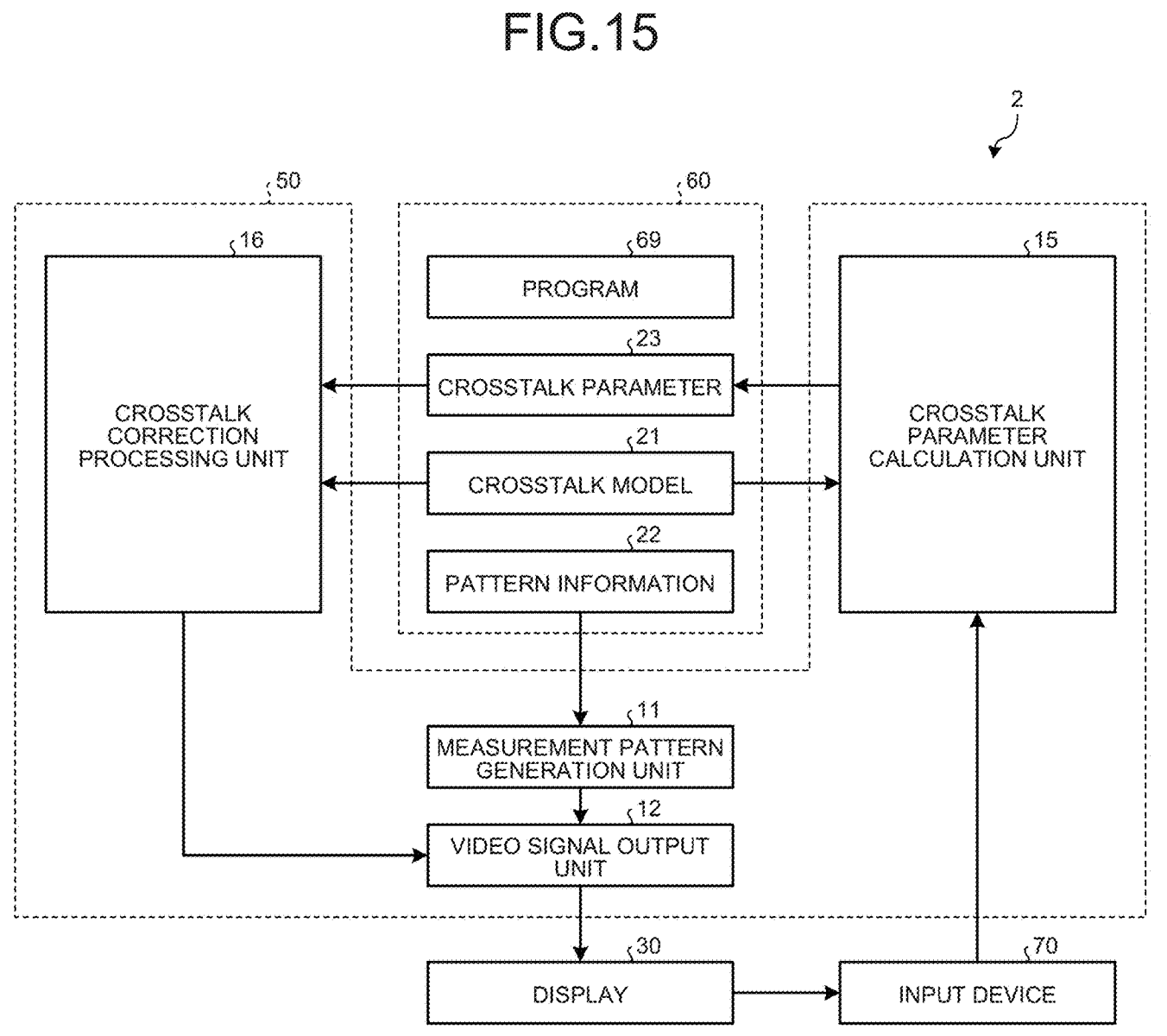

FIG. 15 is a schematic diagram of an information processing device 2 according to a second embodiment.

The present embodiment is different from the first embodiment in that an identical luminance position is visually detected. Therefore, a processing device 50 of the present embodiment does not include the image acquisition unit 13 and the identical luminance position detection unit 14. The identical luminance position is directly input by a user using an input device 70 such as a keyboard, a mouse, and a touch panel. A storage device 60 stores a program 69 for performing information processing corresponding to such visual measurement.

[3-2. Information Processing Method]

Figure 16:
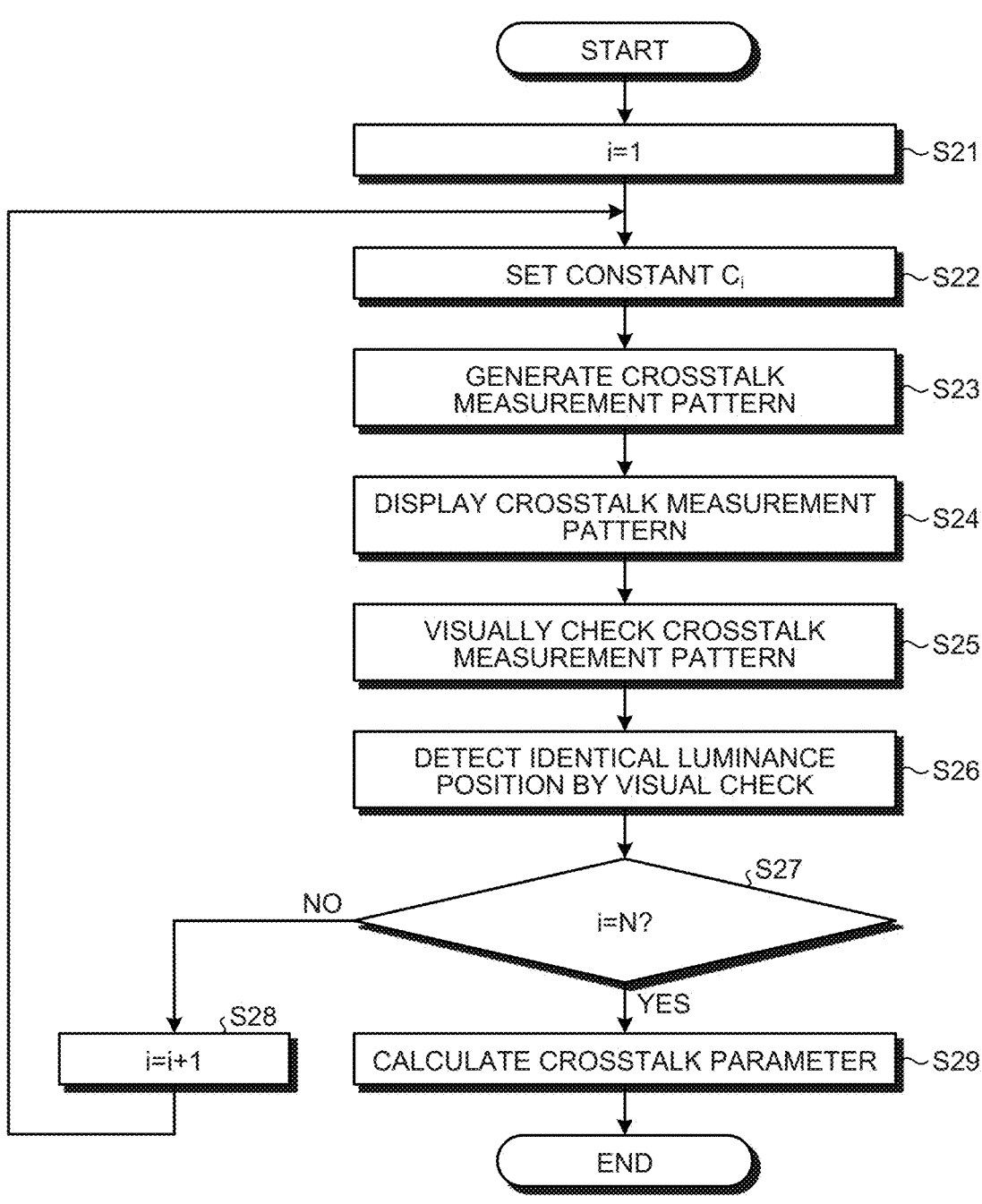
FIG. 16 is a flowchart illustrating an example of information processing.

FIG. 16 is a flowchart illustrating an example of the information processing of the present embodiment.

Steps S21 to S24 are the same as Steps S11 to S14 illustrated in FIG. 11. In the present embodiment, in Step S25, the user visually checks the crosstalk measurement pattern CMP$_i$ displayed on the display 30. The user observes only the left-eye image LPV out of the left-eye image LPV and the right-eye image RPV included in the crosstalk measurement pattern CMP$_i$.

In Step S26, the user detects an identical luminance position at which the region A and the region B of the left-eye image LPV are observed to have the identical luminance. The user inputs the detected identical luminance position of the crosstalk measurement pattern CMP$_i$ to the crosstalk parameter calculation unit 15 using the input device 70. Steps S27 to S29 are the same as Steps S17 to S19 illustrated in FIG. 11.

[3-3. Effects]

Also in the present embodiment, the same effects as those of the first embodiment can be obtained. While the user visually performs measurement, since human eyes have high sensitivity to an adjacent luminance level difference, detection accuracy of an identical luminance position is not greatly impaired. Since the imaging device 40 can be omitted, the configuration of the information processing device 2 is simplified.

4. Third Embodiment

[4-1. Crosstalk Parameter Calculation Method]

In the present embodiment, description will be made of an example in which the above-described method for calculating the crosstalk parameter 23 is applied to a multi-viewpoint image. Hereinafter, the i-th viewpoint is described as an i-th viewpoint V$_i$, and the viewpoint image PV of the i-th viewpoint V$_i$ is described as an i-th viewpoint image PVi. Similarly to the first embodiment, a signal value of the i-th viewpoint is described as V$_{iE}$, and a luminance value of the i-th viewpoint perceived by a person through the display 30 is described as V$_{iV}$. Furthermore, a level of a stage at which a linear mixture model is established is described as V$_{iX}$. Although in the present embodiment, a case where the number of viewpoints is three will be described, a similar method can be applied to a case where the number of viewpoints is four or more.

Also in the present embodiment, the crosstalk characteristic is formulated in three stages of (A) the gradation conversion characteristic of E→X, (B) the mixing characteristic, and (C) the gradation conversion characteristic of X→E. The gradation conversion characteristic of the above (A) is expressed by, for example, a conversion function of the following Formula (11) using the gradation conversion coefficient γ.

$$V_{1X} = V_{1E}^{\gamma} \tag{11}$$

Although in Formula (11), an exponential function is used as a conversion function, the conversion function may not be an exponential function. The conversion function may be any function that has monotonicity and that can define an inverse function. For example, a polynomial or a trigonometric function may be used as the conversion function. While Formula (11) represents a conversion function of the signal value V$_{1E}$ of the first viewpoint, conversion functions of a signal value V$_{2E}$ of the second viewpoint and a signal value V$_{3E}$ of the third viewpoint can also be expressed by the same function as the conversion function of the signal value V$_{iE}$ of the first viewpoint.

The mixing characteristic of the above (B) is expressed by the following Formula (12) using the mixing ratios α and β, for example.

$$\begin{pmatrix} V_{1X}' \\ V_{2X}' \\ V_{3X}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} V_{1X} \\ V_{2X} \\ V_{3X} \end{pmatrix} \tag{12}$$

V$_{iX}'$ is a level of the i-th viewpoint after a first viewpoint level V$_{1X}$, a second viewpoint level V$_{2X}$, and a third viewpoint level V$_{3X}$ are mixed on the basis of the mixing ratios α and β. In Formula (12), for the sake of simplicity, a ratio of the first viewpoint level V$_{1X}$ flowing into a second viewpoint V$_2$ side, a ratio of the second viewpoint level V$_{2X}$ flowing into a third viewpoint V$_3$ side, and a ratio of the third viewpoint level V$_{3X}$ flowing into a first viewpoint V$_1$ side are described as the same value. In addition, a ratio of the third viewpoint level V$_{3X}$ flowing into the second viewpoint V$_2$ side, a ratio of the first viewpoint level V$_{1X}$ flowing into the third viewpoint V$_3$ side, and a ratio of the second viewpoint level V$_{2X}$ flowing into the first viewpoint V$_1$ side are described as the same value. These proportions are, however, not necessarily the same. The nine matrix elements shown in Formula (12) may be values independent from each other.

The gradation conversion characteristic of the above (C) is defined by an inverse function uniquely corresponding to Formula (11), as in the following Formula (13). While Formula (13) represents a conversion function of a first viewpoint level V$_{1X}'$, conversion functions of a second viewpoint level V$_{2X}'$ and a third viewpoint level V$_{3X}'$ can also be expressed by the same function as the conversion function of the first viewpoint level V$_{1X}'$.

$$V_{1E}' = V_{1E}'^{1/\gamma} \tag{13}$$

V$_{iE}'$ represents a signal value of the i-th viewpoint after the signal values V$_{iE}$ of the respective viewpoints are mixed due to crosstalk having luminance dependency. The signal value V$_{iE}'$ is converted into a luminance value V$_{iV}'$ by the display characteristic other than the crosstalk characteristic.

The luminance value $V_{iV}'$ is a luminance value of an image in which the viewpoint images PV of the respective viewpoints are mixed.

[4-2. Crosstalk Correction Processing]

The crosstalk correction is formulated in three stages of (D) the gradation conversion characteristic of E→X, (E) inverse matrix operation processing, and (F) the gradation conversion characteristic of X→E. The gradation conversion characteristic of the above (D) is the same as the gradation conversion characteristic of the above (A), and is expressed by the above Formula (11). The gradation conversion characteristic of the above (F) is the same as the gradation conversion characteristic of the above (C), and is expressed by the above Formula (13). The inverse matrix operation processing of the above (E) is expressed as the following Formula (14) using an inverse matrix of the above Formula (12).

$$\begin{pmatrix} \hat{V}_{1X} \\ \hat{V}_{2X} \\ \hat{V}_{3X} \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix}^{-1} \cdot \begin{pmatrix} V_{1X} \\ V_{2X} \\ V_{3X} \end{pmatrix} \tag{14}$$

In Formula (14), a hat on $V_{iX}$ indicates a level of the i-th viewpoint $V_i$ after the inverse matrix processing. When the crosstalk correction and the crosstalk deterioration are combined, the gradation conversion characteristics of the above (A) and (F) are canceled out, and the mixing characteristics of the above (B) and (E) are canceled out. As a result, a level of each viewpoint after the gradation conversion processing of the above (D) and a level of each viewpoint after the mixing processing of the above (B) match as shown in the following Formula (15). Therefore, video without crosstalk deterioration is perceived.

$$\begin{pmatrix} \hat{V}_{1X}' \\ \hat{V}_{2X}' \\ \hat{V}_{3X}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} \hat{V}_{1X} \\ \hat{V}_{2X} \\ \hat{V}_{3X} \end{pmatrix}$$

$$= \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} \alpha & \beta & 1-\alpha-\beta \\ 1-\alpha-\beta & \alpha & \beta \\ \beta & 1-\alpha-\beta & \alpha \end{pmatrix}^{-1} \cdot \begin{pmatrix} V_{1X} \\ V_{2X} \\ V_{3X} \end{pmatrix}$$

$$= \begin{pmatrix} V_{1X} \\ V_{2X} \\ V_{3X} \end{pmatrix} \tag{15}$$

[4-3. Crosstalk Parameter Calculation Method]

FIG. 17 is a diagram illustrating an example of a method of calculating the crosstalk parameter 23.

In one viewpoint image PV, the plurality of variable patterns VP are periodically arranged in the parallax direction at intervals of three line patterns LP equal to the number of the viewpoints. The line patterns LP other than the variable patterns VP are invariable patterns IVP. In a case where a position of the line pattern LP in the parallax direction is represented by the number (line number) of the line pattern LP counted from an end (e.g., an image end having the minimum y coordinate) of the viewpoint image PV, a position of the variable pattern VP in the parallax direction varies with each viewpoint image PV.

When a coordinate in the longitudinal direction is set as x and a signal value of the variable pattern VP at the coordinate x is set as P(x), the signal value P(x) is a monotonic function. In viewpoint images of two adjacent viewpoints, a direction in which the signal value P(x) of the variable pattern VP increases or decreases is opposite to each other. A sum of the signal values P(x) of the variable patterns VP of the viewpoint images PV of the two adjacent viewpoints is constant, for example, regardless of the coordinates x.

In the example of FIG. 17, each region extending in the x direction is the line pattern LP. For example, in a first viewpoint image PV1, the region A is the variable pattern VP, and regions B+ and B− are the invariable patterns IVP. In a second viewpoint image PV2, the region B+ is the variable pattern VP, and the region A and the region B− are the invariable patterns IVP. In a third viewpoint image PV3, the region B− is the variable pattern VP, and the region A and the region B+ are the invariable patterns IVP. Line numbers of the region A, the region B+, and the region B− of the first viewpoint image PV1, line numbers of the region A, the region B+, and the region B− of the second viewpoint image PV2, and line numbers of the region A, the region B+, and the region B− of the third viewpoint image PV3 are equal to each other.

A signal value of each region is expressed by, for example, the following Formula (16).

$$\begin{pmatrix} V_{1E(A)} \\ V_{2E(A)} \\ V_{3E(A)} \end{pmatrix} = \begin{pmatrix} x \\ 0 \\ 0 \end{pmatrix} \tag{16}$$

$$\begin{pmatrix} V_{1E(B+)} \\ V_{2E(B+)} \\ V_{3E(B+)} \end{pmatrix} = \begin{pmatrix} C \\ 1-x \\ 0 \end{pmatrix}$$

-continued $$\begin{pmatrix} V_{1E(B-)} \\ V_{2E(B-)} \\ V_{3E(B-)} \end{pmatrix} = \begin{pmatrix} C \\ 0 \\ 1-x \end{pmatrix}$$

The signal value of Formula (16) is normalized with 1 as a maximum value of the signal value. C is a constant of 0 or more and 1 or less. Although in the example of Formula (16), signal values $V_{2E(A)}$, $V_{3E(A)}$, $V_{3E(B+)}$, and $V_{2E(B-)}$ are 0, these signal values may be constants other than 0. In crosstalk measurement, a plurality of crosstalk measurement patterns CMP are generated in which combinations of signal values of the invariable patterns IVP are made different.

FIG. 18 is a diagram illustrating an example of a method of measuring crosstalk.

In the present disclosure, a magnitude of crosstalk between the first viewpoint $V_1$ and the second viewpoint $V_2$ and a magnitude of crosstalk between the first viewpoint $V_1$ and the third viewpoint $V_3$ are measured on the basis of a luminance distribution of the first viewpoint image PV1. In the present disclosure, for example, a first identical luminance position at which the region A and the region B+ are observed to have the identical luminance in the first viewpoint image PV1 and a second identical luminance position at which the region A and the region B− are observed to have the identical luminance are detected.

A signal value at the first identical luminance position is expressed by the following Formulas (17) and (18). Coordinates of the first identical luminance position are expressed to have a single bar attached above the coordinates x.

$$\begin{pmatrix} V_{1X(A)}' \\ V_{2X(A)}' \\ V_{3X(A)}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} \bar{x}^\gamma \\ 0 \\ 0 \end{pmatrix} \quad (17)$$

$$\begin{pmatrix} V_{1X(B+)}' \\ V_{2X(B+)}' \\ V_{3X(B+)}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} C^\gamma \\ (1-\bar{x})^\gamma \\ 0 \end{pmatrix} \quad (18)$$

At the first identical luminance position, a relationship of the following Formula (19) is established.

$$V_{1X(A)}' = V_{1X(B+)}' \quad (19)$$

$$\Leftrightarrow \alpha \cdot \bar{x}^\gamma = \alpha \cdot C^\gamma + \beta \cdot (1-\bar{x})^\gamma$$

A signal value at the second identical luminance position is expressed by the following Formulas (20) and (21). Coordinates of the second identical luminance position are expressed to have a double bar attached above the coordinates x.

$$\begin{pmatrix} V_{1X(A)}' \\ V_{2X(A)}' \\ V_{3X(A)}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} \bar{\bar{x}}^\gamma \\ 0 \\ 0 \end{pmatrix} \quad (20)$$

$$\begin{pmatrix} V_{1X(B-)}' \\ V_{2X(B-)}' \\ V_{3X(B-)}' \end{pmatrix} = \begin{pmatrix} \alpha & \beta & 1-\alpha-\beta \\ 1-\alpha-\beta & \alpha & \beta \\ \beta & 1-\alpha-\beta & \alpha \end{pmatrix} \cdot \begin{pmatrix} C^\gamma \\ (1-\bar{\bar{x}})^\gamma \\ 0 \end{pmatrix} \quad (21)$$

At the second identical luminance position, a relationship of the following Formula (22) is established.

$$V_{1X(A)}' = V_{1X(B-)}' \quad (22)$$

$$\Leftrightarrow \alpha \cdot \bar{\bar{x}}^\gamma = \alpha \cdot C^\gamma + (1-\alpha-\beta) \cdot (1-\bar{\bar{x}})^\gamma$$

Luminance is measured for the plurality of crosstalk measurement patterns CMP with different values of the constant C. By this measurement, a plurality of relational expressions between the gradation conversion coefficient $\gamma$ and the mixing ratio $\alpha$ are generated. By combining these relational expressions, values of the gradation conversion coefficient $\gamma$ and the mixing ratios $\alpha$ and $\beta$ are obtained.

A value of each crosstalk parameter 23 is obtained by at least as many simultaneous relational expressions as the number of the crosstalk parameters 23. However, when a calculated value varies with each measurement due to disturbance or the like, the number of simultaneous relational expressions can be increased to calculate a plurality of parameter values for each crosstalk parameter 23. By calculating an average value of the plurality of parameter values as the value of the crosstalk parameter 23, an influence of an error included in each parameter value is suppressed.

Detection of the first identical luminance position and the second identical luminance position may be performed by image analysis as in the first embodiment, or may be performed by visual measurement as in the second embodiment.

[4-4. Effects]

In the present embodiment, crosstalk of a multi-viewpoint image can be satisfactorily suppressed.

Furthermore, the effects described in the present specification are examples only and are not limited, and other effects may be provided.

[Supplementary Note]

Note that the present technique is allowed to also have the following configurations.

(1)

An information processing device comprising:

a measurement pattern generation unit that generates a crosstalk measurement pattern; and a crosstalk parameter calculation unit that applies a measurement result of the crosstalk measurement pattern to a crosstalk model including a plurality of deterioration characteristics to calculate a crosstalk parameter set for each deterioration characteristic.

(2)

The information processing device according to (1), wherein the plurality of deterioration characteristics include a gradation characteristic indicating gradation dependency of crosstalk and a mixing characteristic indicating a degree of interference between viewpoint images, and the crosstalk parameter calculation unit respectively calculates a gradation conversion coefficient indicating the gradation characteristic and a mixing ratio indicating the mixing characteristic as the crosstalk parameter.

(3)

The information processing device according to (1) or (2), wherein the crosstalk measurement pattern includes a plurality of viewpoint images corresponding to different viewpoints, each viewpoint image having a plurality of line patterns arranged in a parallax direction, and the crosstalk parameter calculation unit applies the measurement result of a luminance difference between the line patterns in the same viewpoint image to the crosstalk model.

(4)

The information processing device according to (3), wherein the plurality of line patterns include a plurality of variable patterns and a plurality of invariable patterns, the variable pattern being a line pattern in which a signal value varies depending on a position in a longitudinal direction orthogonal to the parallax direction, the invariable pattern being a line pattern in which the signal value is constant in the entire longitudinal direction, and a position of the variable pattern in the parallax direction varying with each viewpoint image, and when a coordinate in the longitudinal direction is set as x and a signal value of the variable pattern at the coordinate x is set as $P(x)$, the signal value $P(x)$ is a monotonic function, and in the viewpoint images of two adjacent viewpoints, a direction in which the signal value $P(x)$ of the variable pattern increases or decreases is opposite to each other.

(5)

The information processing device according to (4), wherein the measurement pattern generation unit generates a plurality of crosstalk measurement patterns in which combinations of signal values of the invariable patterns are made different, and the crosstalk parameter calculation unit applies, to the crosstalk model, the measurement result for the coordinate x at which the luminance difference is equal to or less than a threshold value, the measurement result being measured for each of the crosstalk measurement patterns.

(6)

The information processing device according to (5), wherein the plurality of line patterns include a plurality of variable patterns and a plurality of invariable patterns, the variable pattern being a line pattern in which a signal value varies depending on time, the invariable pattern being a line pattern in which a signal value is constant regardless of time, and a position of the variable pattern in the parallax direction varying with each viewpoint image, and when a measurement time is set as t and a signal value of the variable pattern at time t is set as $Q(t)$, the signal value $Q(t)$ is a monotonic function, and in the viewpoint images of two adjacent viewpoints, a direction in which the signal value $Q(t)$ of the variable pattern increases or decreases is opposite to each other.

(7)

The information processing device according to (6), wherein the measurement pattern generation unit generates a plurality of crosstalk measurement patterns in which combinations of signal values of the invariable patterns are made different, and the crosstalk parameter calculation unit applies, to the crosstalk model, the measurement result for time t at which the luminance difference is equal to or less than a threshold value, the measurement result being measured for each of the crosstalk measurement patterns.

(8)

The information processing device according to (5) or (7), wherein the measurement pattern generation unit generates the number of the crosstalk measurement patterns larger than the number of the crosstalk parameters, and the crosstalk parameter calculation unit calculates a plurality of parameter values for each crosstalk parameter in accordance with the number of the crosstalk measurement patterns, and calculates an average value of the plurality of parameter values as a value of the crosstalk parameter.

(9)

The information processing device according to (8), wherein the crosstalk parameter calculation unit calculates a weighted average of the plurality of parameter values on the basis of a weight set for each crosstalk measurement pattern, and outputs the weighted average as a value of the crosstalk parameter.

(10)

The information processing device according to (5) or any one of (7) to (9), wherein the measurement pattern generation unit generates a single test image in which the plurality of crosstalk measurement patterns are incorporated in the same screen.

(11)

The information processing device according to (10), wherein the measurement pattern generation unit allocates the plurality of crosstalk measurement patterns to pixels of different colors.

(12)

The information processing device according to any one of (1) to (10), wherein the measurement pattern generation unit generates the crosstalk measurement pattern as an invisible pattern to be incorporated in a visible light image.

(13)

An information processing method to be executed by a computer, the information processing method comprising:

generating a crosstalk measurement pattern; and applying a measurement result of the crosstalk measurement pattern to a crosstalk model including a plurality of deterioration characteristics to calculate a crosstalk parameter set for each deterioration characteristic.

(14)

A program for causing a computer to implement:

generating a crosstalk measurement pattern; and applying a measurement result of the crosstalk measurement pattern to a crosstalk model including a plurality of deterioration characteristics to calculate a crosstalk parameter set for each deterioration characteristic.

(15)

An information processing device comprising:

a measurement pattern generation unit that generates a crosstalk measurement pattern; and a crosstalk parameter calculation unit that applies a measurement result of the crosstalk measurement pattern to a crosstalk model including one or more deterioration characteristics to calculate a crosstalk parameter set for each deterioration characteristic, wherein the crosstalk measurement pattern includes a plurality of viewpoint images corresponding to different viewpoints, each viewpoint image having a plurality of line patterns arranged in a parallax direction, and the crosstalk parameter calculation unit applies the measurement result of a luminance difference between the line patterns in the same viewpoint image to the crosstalk model.

(16)

An information processing method to be executed by a computer, the information processing method comprising:

generating a crosstalk measurement pattern; and applying a measurement result of the crosstalk measurement pattern to a crosstalk model including one or more deterioration characteristics to calculate a crosstalk parameter set for each deterioration characteristic, wherein the crosstalk measurement pattern includes a plurality of viewpoint images corresponding to different viewpoints,

23 each viewpoint image having a plurality of line patterns arranged in a parallax direction, and the crosstalk parameter calculation applies the measurement result of a luminance difference between the line patterns in the same viewpoint image to the crosstalk model.

(17)

A program for causing a computer to implement:

generating a crosstalk measurement pattern; and applying a measurement result of the crosstalk measurement pattern to a crosstalk model including one or more deterioration characteristics to calculate a crosstalk parameter set for each deterioration characteristic, wherein the crosstalk measurement pattern includes a plurality of viewpoint images corresponding to different viewpoints, each viewpoint image having a plurality of line patterns arranged in a parallax direction, and the crosstalk parameter calculation applies the measurement result of a luminance difference between the line patterns in the same viewpoint image to the crosstalk model.

REFERENCE SIGNS LIST 1, 2 INFORMATION PROCESSING DEVICE
11 MEASUREMENT PATTERN GENERATION UNIT
15 CROSSTALK PARAMETER CALCULATION UNIT
21 CROSSTALK MODEL
23 CROSSTALK PARAMETER
CMP CROSSTALK MEASUREMENT PATTERN
IVI INVISIBLE PATTERN
IVP INVARIABLE PATTERN
LP LINE PATTERN
PV VIEWPOINT IMAGE
TI TEST IMAGE
VI VISIBLE LIGHT IMAGE
VP VARIABLE PATTERN
$\alpha$, $\beta$ MIXING RATIO
$\gamma$ GRADATION CONVERSION COEFFICIENT

The invention claimed is:

1. An information processing device comprising:

circuitry configured to generate a crosstalk measurement pattern, and apply a measurement result of the generated crosstalk measurement pattern to a crosstalk model including a plurality of deterioration characteristics to calculate a crosstalk parameter set for each deterioration characteristic, wherein the crosstalk measurement pattern includes a plurality of viewpoint images corresponding to different viewpoints, each viewpoint image having a plurality of line patterns arranged in a parallax direction, and wherein the circuitry applies the measurement result of a luminance difference between the line patterns in a same viewpoint image to the crosstalk model.

2. The information processing device according to claim 1, wherein the plurality of deterioration characteristics include a gradation characteristic indicating gradation dependency of crosstalk and a mixing characteristic indicating a degree of interference between viewpoint images, and wherein the circuitry is further configured to respectively calculate a gradation conversion coefficient indicating the gradation characteristic and a mixing ratio indicating the mixing characteristic as the crosstalk parameter.

3. The information processing device according to claim 1, wherein the plurality of line patterns include a plurality of variable patterns and a plurality of invariable patterns, the variable pattern being a line pattern in which a signal value varies depending on a position in a longitudinal direction orthogonal to the parallax direction, the invariable pattern being a line pattern in which the signal value is constant in the entire longitudinal direction, and a position of the variable pattern in the parallax direction varying with each viewpoint image, and when a coordinate in the longitudinal direction is set as x and a signal value of the variable pattern at the coordinate x is set as P (x), the signal value P (x) is a monotonic function, and in the viewpoint images of two adjacent viewpoints, a direction in which the signal value P (x) of the variable pattern increases or decreases is opposite to each other.

4. The information processing device according to claim 3, wherein the circuitry generates a plurality of crosstalk measurement patterns in which combinations of signal values of the invariable patterns are made different, and wherein the circuitry applies, to the crosstalk model, the measurement result for the coordinate x at which the luminance difference is equal to or less than a threshold value, the measurement result being measured for each of the crosstalk measurement patterns.

5. The information processing device according to claim 4, wherein the plurality of line patterns include a plurality of variable patterns and a plurality of invariable patterns, the variable pattern being a line pattern in which a signal value varies depending on time, the invariable pattern being a line pattern in which a signal value is constant regardless of time, and a position of the variable pattern in the parallax direction varying with each viewpoint image, and when a measurement time is set as t and a signal value of the variable pattern at time t is set as Q (t), the signal value Q (t) is a monotonic function, and in the viewpoint images of two adjacent viewpoints, a direction in which the signal value Q (t) of the variable pattern increases or decreases is opposite to each other.

6. The information processing device according to claim 5, wherein the circuitry generates the plurality of crosstalk measurement patterns in which combinations of signal values of the invariable patterns are made different, and wherein the circuitry applies, to the crosstalk model, the measurement result for time t at which the luminance difference is equal to or less than a threshold value, the measurement result being measured for each of the crosstalk measurement patterns.

7. The information processing device according to claim 4, wherein the circuitry generates a number of the crosstalk measurement patterns larger than a number of the crosstalk parameters, and wherein the circuitry is further configured to calculate a plurality of parameter values for each crosstalk parameter in accordance with the number of the crosstalk measurement patterns, and calculate an average value of the plurality of parameter values as a value of the crosstalk parameter.

8. The information processing device according to claim 7, wherein the circuitry is further configured to calculate a weighted average of the plurality of parameter values on the basis of a weight set for each crosstalk measurement pattern, and output the weighted average as a value of the crosstalk parameter.

9. The information processing device according to claim 4, wherein the circuitry is further configured to generate a single test image in which the plurality of crosstalk measurement patterns are incorporated in a same screen.

10. The information processing device according to claim 9, wherein the circuitry is further configured to allocate the plurality of crosstalk measurement patterns to pixels of different colors.

11. The information processing device according to claim 1, wherein the circuitry is further configured to generate the crosstalk measurement pattern as an invisible pattern to be incorporated in a visible light image.

12. An information processing method to be executed by a computer, the information processing method comprising:

generating a crosstalk measurement pattern; and applying a measurement result of the generated crosstalk measurement pattern to a crosstalk model including a plurality of deterioration characteristics to calculate a crosstalk parameter set for each deterioration characteristic, wherein the crosstalk measurement pattern includes a plurality of viewpoint images corresponding to different viewpoints, each viewpoint image having a plurality of line patterns arranged in a parallax direction, and wherein the measurement result of a luminance difference betweenn the line patterns in a same viewpoint image is applied to the crosstalk model.

13. A non-transitory computer-readable storage medium having embodied thereon a program, which when executed by a computer causes the computer to execute a method, the method comprising:

generating a crosstalk measurement pattern; and applying a measurement result of the generated crosstalk measurement pattern to a crosstalk model including a plurality of deterioration characteristics to calculate a crosstalk parameter set for each deterioration characteristic, wherein the crosstalk measurement pattern includes a plurality of viewpoint images corresponding to different viewpoints, each viewpoint image having a plurality of line patterns arranged in a parallax direction, and wherein the measurement result of a luminance difference between the line patterns in a same viewpoint image is applied to the crosstalk model.

\* \* \* \* \*